(12) United States Patent
Jayne

(10) Patent No.: US 7,435,082 B2
(45) Date of Patent: Oct. 14, 2008

(54) FURNACE USING PLASMA IGNITION SYSTEM FOR HYDROCARBON COMBUSTION

(75) Inventor: Michael E. Jayne, 13 Village Park Rd., Amherst, MA (US) 01002

(73) Assignee: Michael E. Jayne, Amherst, MA (US)

( * ) Notice: Subject to any disclaimer, the term of this patent is extended or adjusted under 35 U.S.C. 154(b) by 317 days.

(21) Appl. No.: 11/114,184

(22) Filed: Apr. 26, 2005

(65) Prior Publication Data

US 2005/0208446 A1 Sep. 22, 2005

Related U.S. Application Data

(63) Continuation-in-part of application No. 10/321,721, filed on Dec. 18, 2002, now Pat. No. 6,883,490, which is a continuation of application No. 09/954,195, filed on Sep. 18, 2001, now abandoned, which is a continuation of application No. 09/501,788, filed on Feb. 11, 2000, now Pat. No. 6,289,868.

(51) Int. Cl.
*B23K 10/00* (2006.01)

(52) U.S. Cl. ........................ 431/264; 431/265; 431/266; 431/159; 431/174; 123/260; 123/297; 123/143 B

(58) Field of Classification Search .................. 431/264, 431/265, 266, 159, 174; 123/260
See application file for complete search history.

(56) References Cited

U.S. PATENT DOCUMENTS

| | | | | |
|---|---|---|---|---|
| 3,714,390 A | * | 1/1973 | Foex et al. | 219/121.37 |
| 3,741,390 A | * | 6/1973 | Wallace et al. | 210/744 |
| 4,041,922 A | * | 8/1977 | Abe et al. | 123/260 |
| 4,487,177 A | * | 12/1984 | Ishikawa | 123/260 |
| 5,539,176 A | * | 7/1996 | Ikegaya et al. | 219/121.59 |
| 5,619,959 A | * | 4/1997 | Tozzi | 123/143 B |
| 6,565,361 B2 | * | 5/2003 | Jones et al. | 438/6 |
| 2003/0044741 A1 | * | 3/2003 | McGehee | 431/263 |

* cited by examiner

*Primary Examiner*—Steven B. McAllister
*Assistant Examiner*—Nikhil Mashruwala
(74) *Attorney, Agent, or Firm*—Smith Patent Office

(57) ABSTRACT

An apparatus and method for the creation, placement and control of an area of electrical ionization within an internal combustion engine combustion chamber or a fuel burner for a furnace is disclosed. A furnace includes a fuel source, a fuel burner, a plasma nozzle and igniter assembly, and the associated housing and flue structures. The plasma nozzle and igniter assembly is arranged so that the fuel sprayed out from the nozzle into the combustion area passes through or in close proximity to the area of plasma ionization. A fuel burner equipped with this electrical ionization device has its fuel efficiency enhanced by the complete and immediate combustion of substantially all of the fuel that passes through the area of plasma ionization. Exhaust gas recirculation using this system is also disclosed.

1 Claim, 19 Drawing Sheets

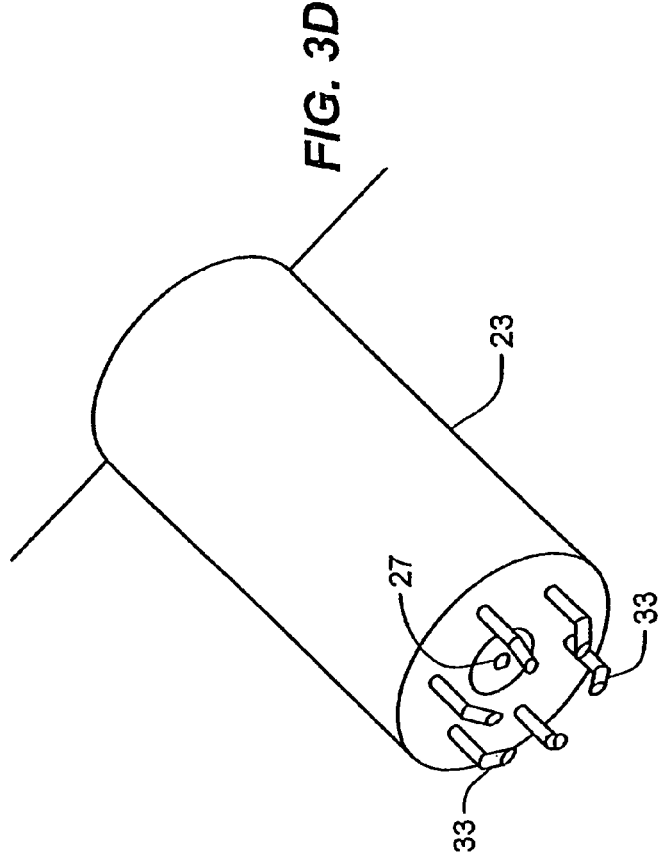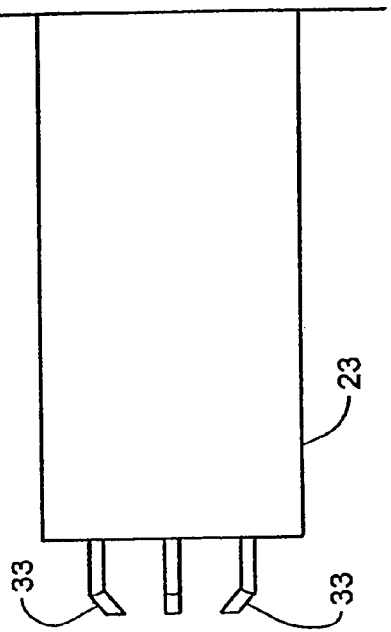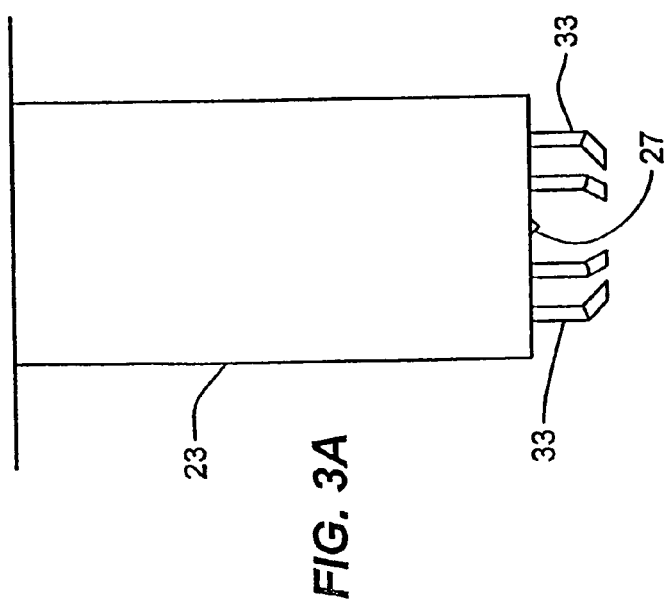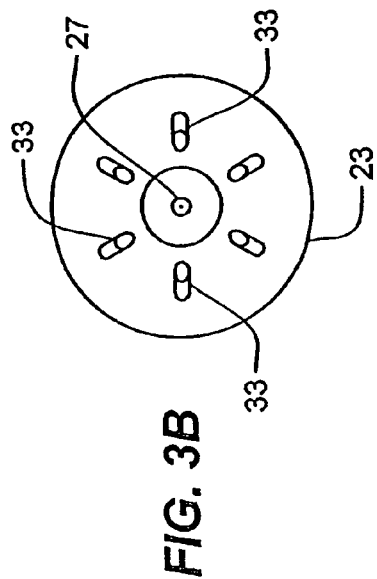

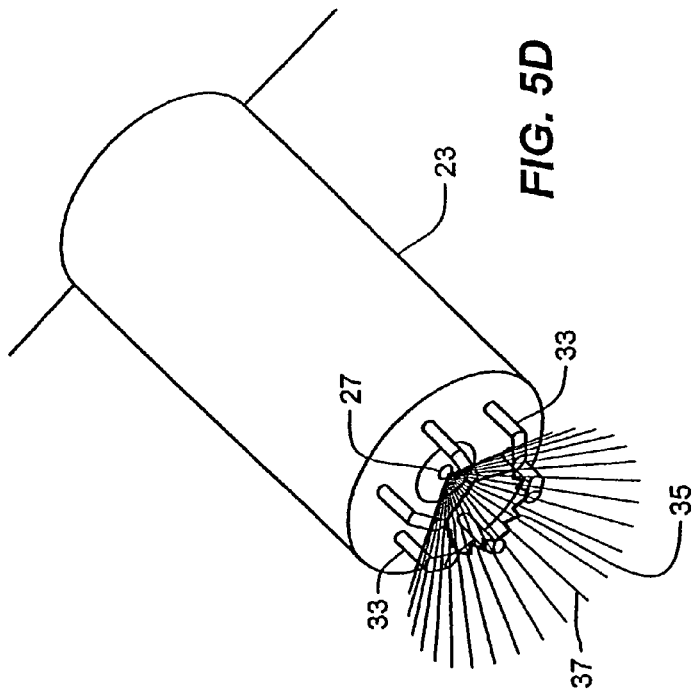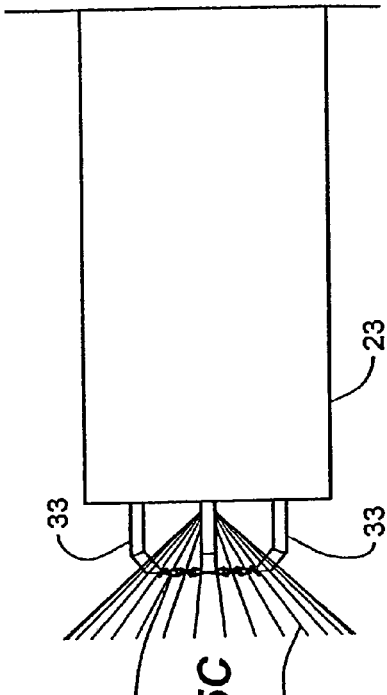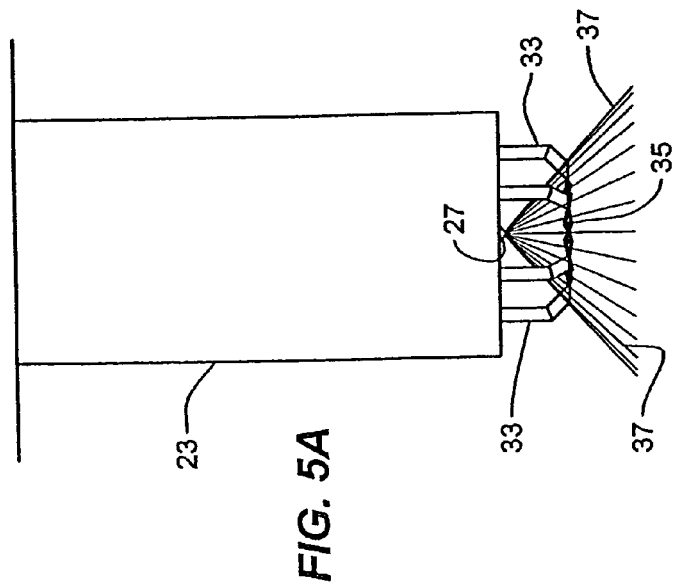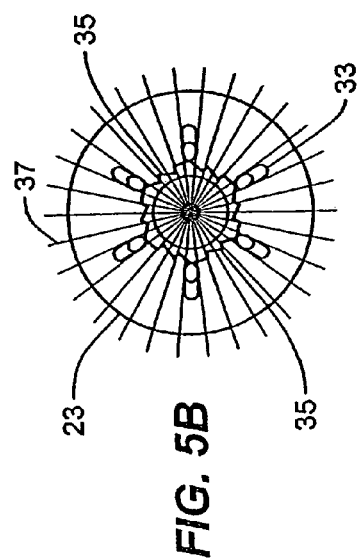

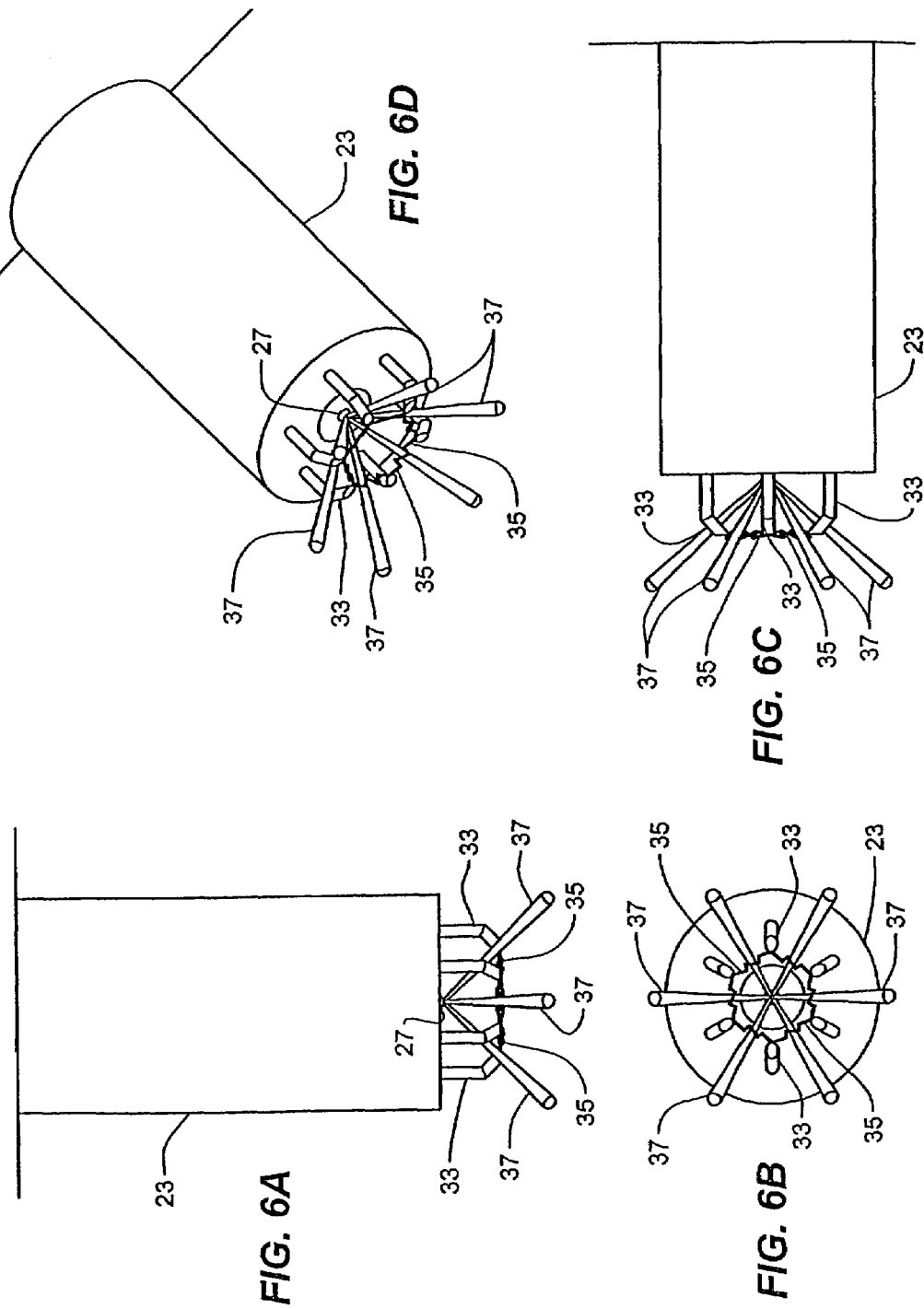

FURNACE USING PLASMA IGNITION SYSTEM FOR HYDROCARBON COMBUSTION

CROSS REFERENCE TO RELATED APPLICATIONS

This new application is a continuation-in-part application of U.S. patent application Ser. No. 10/321,721 filed on Dec. 18, 2002, now U.S. Pat. No. 6,883,490, which is a continuation of U.S. application Ser. No. 09/954,195 filed on Sep. 18, 2001, now abandoned, which is a continuation of U.S. application Ser. No. 09/501,788 filed on Feb. 11, 2000, now U.S. Pat. No. 6,289,868. These prior applications are incorporated herein by reference.

BACKGROUND OF THE INVENTION

1. Field of the Invention

The present invention relates to a method and apparatus for improving fuel burners in furnaces by using a plasma ignition system.

2. Description of the Related Art

As described in applicant's prior applications listed above and incorporated herein by reference, there are numerous problems with the combustion process for diesel engines. None of the prior art references disclosed an apparatus that will allow for the initiation of combustion for all of the fuel as it is injected into the combustion chamber followed by the maintenance of the combustion process to its completion in the manner described therein.

Also, fuel burner technology for furnaces usually relies upon a simple electrical arc discharge ignition system, usually positioned to one side of the fuel spray coming out of the nozzle. In some cases the ignition system is as primitive as a simple pilot light for flame ignition.

Although these oil burner ignition systems are simple, reliable, and cheap they have absolutely no fuel treatment capability. This lack of point of use fuel treatment results in four serious limitations:

1. Less than optimal fuel efficiency as a result of incomplete combustion;
2. Pollutant emissions as evidenced by the production of oxides of nitrogen ($NO_x$), carbon monoxide (CO), hydrocarbons, and particulates (soot) that are observed in the exhaust output;
3. Unstable combustion when dealing with fuel that has been contaminated by water; and
4. Imposed limitations on the fuel oil weight used in a given burner design.

To date, a variety of methods have been employed to improve the efficiency of and reduce pollution from fuel oil burners used in furnaces and similar systems. Higher fuel pressures, smaller fuel nozzle orifice sizes, different fuel nozzle configurations, improved fuel/air mixing arrangements, fuel pre-heating, and improved heat exchanger systems have provided for improved fuel efficiency and some reduction in pollutant emissions.

None of these approaches has the effect of chemically altering the fuel on its molecular level.

As best understood, the present invention chemically alters the fuel in the combustion process directly at the fuel's point of use, changing the fuel's chemical structure right after it leaves the fuel oil burner's nozzle as it enters the combustion area. This enhances the fuel combustion process significantly. These benefits of the present invention are complimentary with and in addition to those realized by the previously mentioned methods currently in use.

SUMMARY OF THE INVENTION

It is accordingly an object of the present invention to provide an apparatus and method for assuring the immediate and complete combustion of any hydrocarbon fuel sprayed into the combustion area of furnaces and similar systems.

It is a further object of the present invention to make it possible to easily retrofit this apparatus to existing furnaces and also to provide a method for assuring the complete combustion of any hydrocarbon fuels in the existing fuel burners.

An area of ionizing electrical energy, effectively an electrical catalyst, (for purposes of illustration, it is referred to as a "plasma ball" or "ring-of-fire") is created inside the combustion area directly in front of the fuel nozzle. The placement of this plasma ball is critical in that all of the fuel must pass through the plasma ball as it enters the combustion area.

Plasma created between the electrodes of the plasma ball generator of the present invention may not be perfectly spherical in shape. The term "plasma ball" or "ball of plasma" as used herein, includes a spherical shaped plasma as well as other polygonal shapes, such as a partially flattened sphere or an elongated hemisphere. When the plasma discharge is operated in still air with the electrodes placed closely together the shape of the discharge, while being close to spherical to the naked eye, is more accurately an ellipsoid. When the plasma discharge is being put to work, the movement of air and fuel through the plasma ball distorts it further from the ellipsoid shape to a shape similar to a tee-pee with the pole ridges marking the electrode locations. As long as the plasma discharge is vigorous, the change in shape does not have a significant effect on the performance of the plasma.

Plasma is defined in the world of physics as a state of matter where the electrons that normally orbit the nucleus of an atom are instead dissociated from the nucleus. For the purposes of the present invention, it is unnecessary and inefficient to create pure plasma in which all of the electrons of all of the atoms are separated from all of the nuclei. The partial plasma created by the present invention strips off enough electrons to do what needs to be done for effective fuel treatment to take place.

These outer electrons are referred to as outer valence electrons. As best understood, these are the electrons that the "Plasma ball" created by the present invention is adept at removing. By having the correct shared outer electrons stripped away from the carbon atoms of the fuel molecules, these fuel molecules are broken down into shorter chain hydrocarbon fuel molecules such as, but not limited to methane, ethane, propane, butane, and pentane that are well known to burn much cleaner than almost all longer chain hydrocarbons.

This treatment of the fuel using the plasma ball ignition system also does other functions. It is believed that in addition to breaking down the fuel molecule into shorter chain hydrocarbons, it also puts an electrical charge onto each shorter chain hydrocarbon molecule. The effect of this electrical charge on the shorter chain hydrocarbon molecules is to increase its reactivity to oxygen dramatically. All that is needed for the shorter chain hydrocarbon molecules to ignite is for them to come into contact with oxygen.

The same molecular dissociation that breaks fuel oil molecules down also enables oil burners equipped with the present invention to deal with water contamination of the fuel with ease. When water mixed with the fuel passes through the "Plasma ball" it is believed to be electrolyzed into hydrogen and oxygen and then the hydrogen ignites and burns with the rest of the fuel without interfering with the overall combustion stability.

Both the chemistry of the fuel and the combustion process itself are completely changed by the "Plasma ball" point of use fuel treatment method and apparatus when utilized in a hydrocarbon fuel burner. It is believed to act as an electrical catalyst which greatly promotes the immediate and complete combustion of all of the fuel resulting in the following advantageous effects:

1) Greater fuel efficiency as a result of earlier completion of combustion thus allowing more time for heat transfer from the combustion gases to the heat exchanger wall.

2) Greater fuel efficiency than available from the present technology oil burners by burning completely those hydrocarbon components usually coming out of the exhaust flue as hydrocarbon emissions such as carbon monoxide, particulate matter, soot, and others.

3) Reduced hydrocarbon pollutant emissions as a direct result of complete combustion of all of the fuel.

4) The ability to greatly reduce pollutant emissions of oxides of nitrogen by making possible the much more aggressive utilization of exhaust gas recirculation without the loss of combustion efficiency.

5) The ability to maintain stable combustion when using fuels contaminated with water.

6) The ability to effectively and efficiently use heavier weight fuel oils that cost much less due to the present invention's ability to convert these lower quality fuels into much easier to combust compounds at the point of use.

The efficacy of the "Plasma ball" point of use fuel treatment and ignition system is evidenced by the empirical observations made during a series of side-by-side comparative tests. For this testing program, a Riello model 40F10 oil burner was retrofitted with the plasma ball point of use fuel treatment system and installed in a furnace heating a commercial building and compared to exactly the same furnace and oil burner setup next to each other under the same conditions at the same time. Fuel efficiency was improved on average 7.6% with over-all pollutant emissions reduced between 25 to 35%, depending on the specific pollutant. Earlier testing done on a home heating furnace with a retrofitted Beckett oil burner according to the present invention had the result of showing no detectable particulates and a carbon monoxide level below that which could be detected by the testing equipment being used.

BRIEF DESCRIPTION OF THE DRAWINGS

The above and other objects and features of the present invention will be clearly understood from the following description with respect to the preferred embodiment thereof when considered in conjunction with the accompanying drawings and diagrams, in which:

FIG. 3A is an enlarged side view of the lower end of the injector/igniter apparatus that extends through the cylinder head.

FIG. 3B is an enlarged bottom view of the injector/igniter apparatus.

FIG. 3C is an enlarged side view of the injector/igniter apparatus rotated by 90 degrees from the view presented in FIG. 3A.

FIG. 3D is an enlarged perspective view of the injector/igniter apparatus.

FIG. 5A is an enlarged side view of the injector/igniter apparatus with the Ring-of-Fire shown in operation and with fuel being injected by a pintle type of fuel injector.

FIG. 5B is an enlarged bottom view of the injector/igniter apparatus with the Ring-of-Fire shown in operation and with fuel being injected by a pintle type of fuel injector.

FIG. 5C is an enlarged side view of the injector/igniter apparatus rotated by 90 degrees from the view presented in FIG. 5A with the Ring-of-Fire shown in operation and with fuel being injected by a pintle type of fuel injector.

FIG. 5D is an enlarged perspective view of the injector/igniter apparatus with the Ring-of-Fire shown in operation and with fuel being injected by a pintle type of fuel injector.

FIG. 6A is an enlarged side view of the injector/igniter apparatus with the Ring-of-Fire shown in operation and with fuel being injected by a hole type of fuel injector.

FIG. 6B is an enlarged bottom view of the injector/igniter apparatus with the Ring-of-Fire shown in operation and with fuel being injected by a hole type of fuel injector.

FIG. 6C is an enlarged side view of the injector/igniter apparatus rotated by 90 degrees from the view presented in FIG. 6A with the Ring-of-Fire shown in operation and with fuel being injected by a hole type of fuel injector.

FIG. 6D is an enlarged perspective view of the injector/igniter apparatus with the Ring-of-Fire shown in operation and with fuel being injected by a hole type of fuel injector.

DETAILED DESCRIPTION OF THE PREFERRED EMBODIMENTS

The invention will now be described in further detail in connection with illustrative preferred embodiments for improving combustion in a direct injected internal combustion engine enabling the engine to achieve better fuel economy, reduced pollutant emissions, and more power. Within the scope of the present invention, this system could be applied to gas turbines and to reciprocating internal combustion engines that are direct injected of either the 2-stroke or the 4-stroke type that have been designed for use with any type of combustible fuel including gasoline, diesel or jet fuel.

Figure 1:
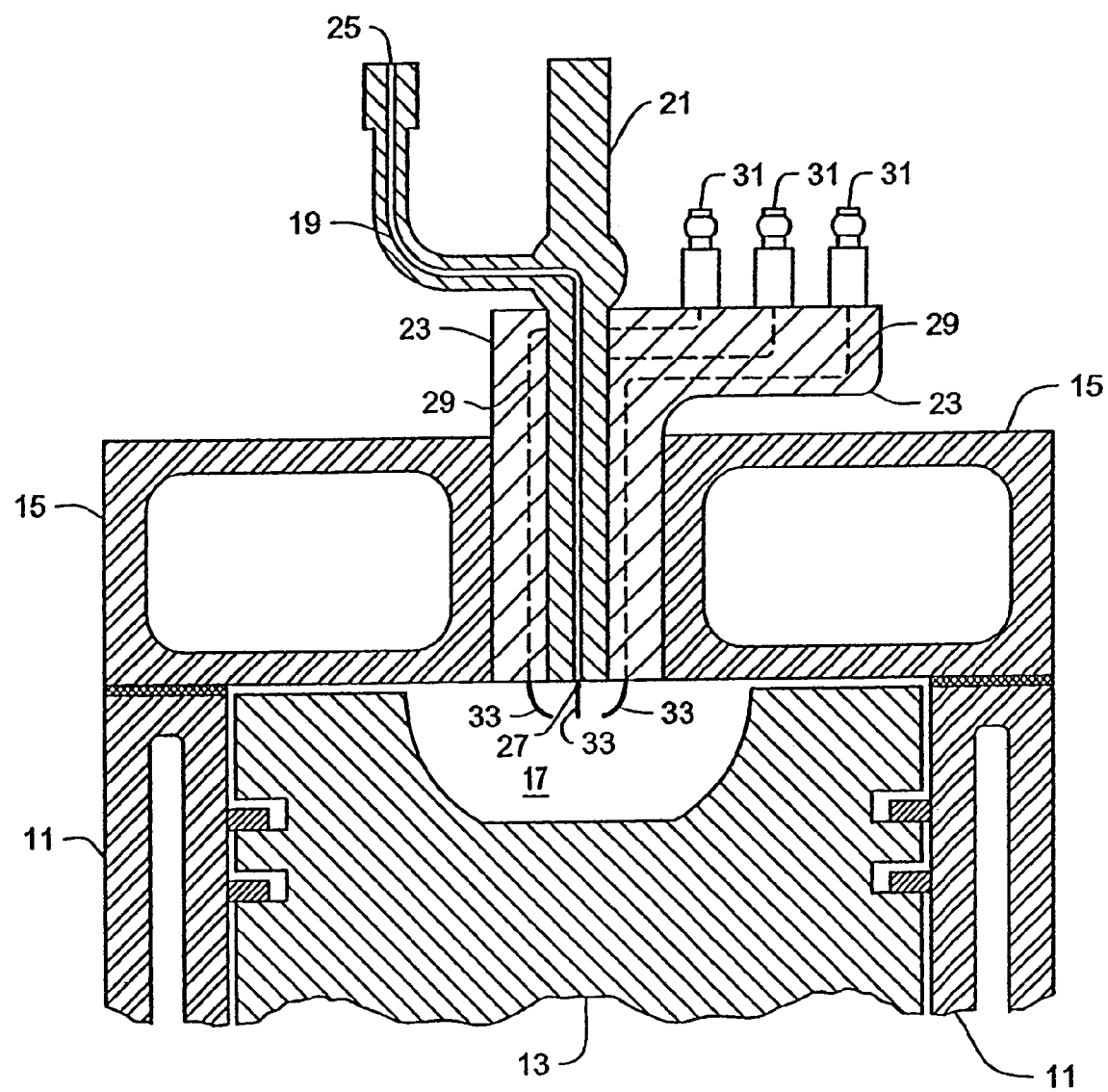
FIG. 1 is a cross sectional side view of the injector/igniter apparatus of the present invention installed in an engine cylinder head.

Referring to FIG. 1, the present invention is shown mounted in a cylinder head 15 of a diesel engine. An engine block 11 has placed inside it a piston 13 and mounted on top of the engine block 11 is the cylinder head 15. A combustion chamber 17 is located inside the area surrounded by the engine block 11, the piston 13, and the cylinder head 15. Passing through the cylinder head 15 is a fuel injector 21 that has its lower body surrounded by a ceramic sleeve 23. A fuel inlet 25 attached to the upper portion of the fuel injector 21 has a fuel passageway 19 that allows fuel to travel to a fuel injection nozzle 27. This fuel injection nozzle 27 protrudes into the inside of the combustion chamber 17.

A plurality of embedded wires 29 travel from high voltage terminals 31 mounted on the ceramic sleeve 23 outside and above the cylinder head 15 through the length of the ceramic sleeve 23 including substantially parallel to the lower portion of the fuel injector 21. These embedded wires 29 extend into the combustion chamber 17 as electrodes 33. In this embodiment, there are six electrodes 33 arrayed around and below the fuel injector nozzle 27 inside the combustion chamber 17. All six electrodes 33 are individually connected to high voltage terminals 31 by their own embedded wire 29.

Figure 2:
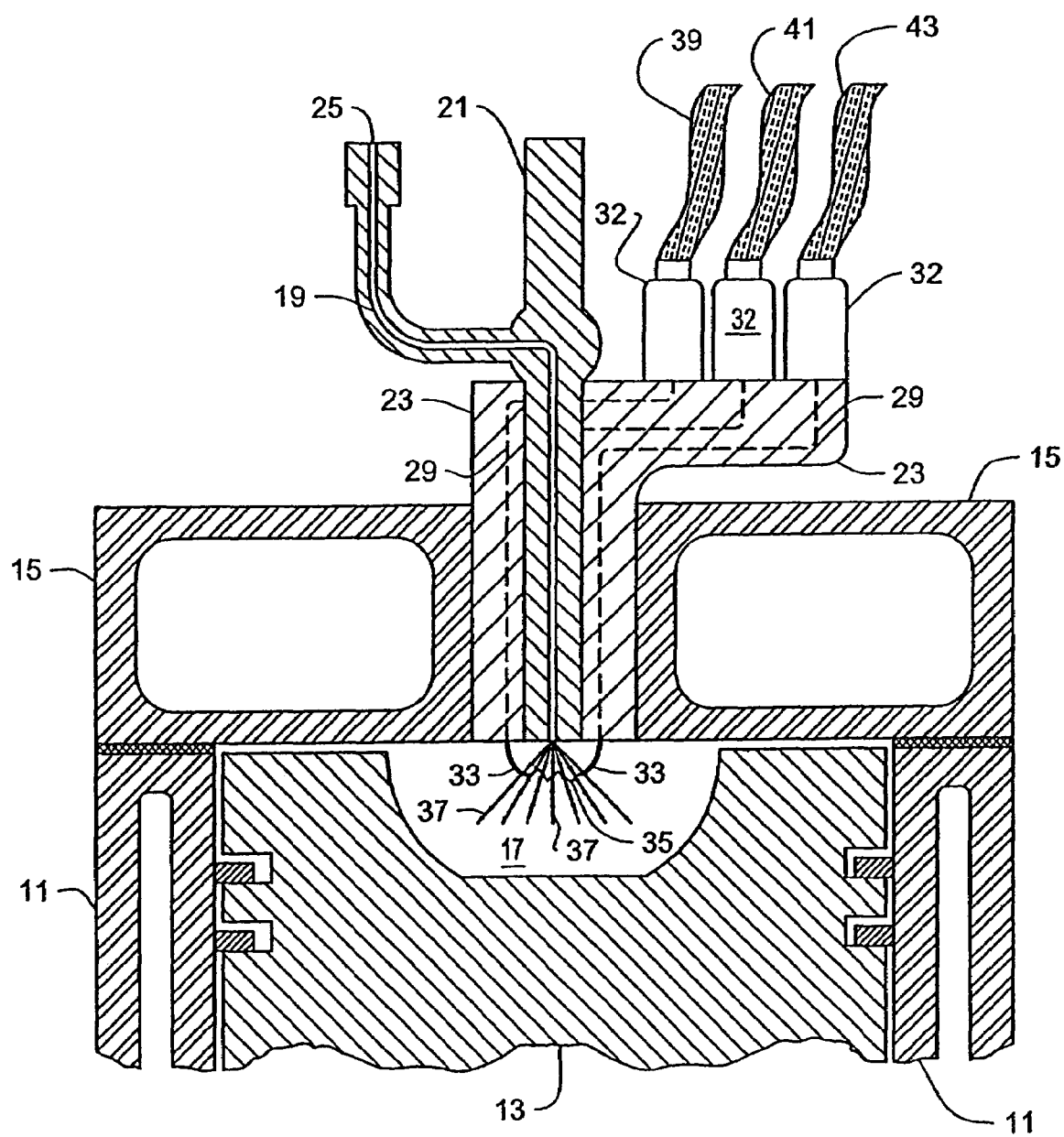
FIG. 2 is a cross sectional side view of the injector/igniter apparatus of the present invention installed in an engine cylinder head with fuel being injected into the combustion chamber.

Referring to FIG. 2, pressurized fuel is shown entering the fuel injector 21 through the fuel inlet 25, down fuel passageway 19, and then out of the fuel injector nozzle 27 into the combustion chamber 17 producing a fuel injection spray pattern 37. While this is happening, a high voltage discharge 35 occurs between all of the tips of the six electrodes 33 inside the combustion chamber 17, with the fuel injection spray pattern 37 passing right next to, or through the high voltage discharge 35. The power for the high voltage discharge 35 that occurs between the six electrodes 33 is produced by a set of six high voltage discharge circuits 51, 53, 55, 57, 59 and 61 (discussed in detail with reference to FIGS. 11 and 12).

A set of six spark plug type high voltage wires 39, 41, 43, 45, 47 and 49 connects on one end to the set of six high voltage discharge circuits 51, 53, 55, 57, 59 and 61. The other end of the set of six spark plug type high voltage wires 39, 41, 43, 45, 47 and 49 have an externally insulated connector 32 that secures and protects the connection to the six high voltage terminals 31 mounted on the upper portion of the ceramic sleeve 23. This set of six high voltage discharge circuits 51, 53, 55, 57, 59 and 61 is controlled by a signal generation circuit 63 which has its position in the system discussed in connection with FIG. 12 and has its operation discussed in detail in connection with FIG. 9.

FIG. 3A is a side view of the lower portion of the ceramic sleeve 23 that extends through the cylinder head 15 into the combustion chamber 17. The fuel injection nozzle 27 at the end of the fuel injector 21 and electrodes 33 are on the end of the ceramic sleeve 23 that faces into the combustion chamber 17.

FIG. 3B shows the only part of the present invention that is actually exposed to the inside of the combustion chamber 17. The six electrodes 33 are arranged in a circular manner around the fuel injection nozzle 27.

FIG. 3C shows the same piece of the present invention that is illustrated by FIG. 3A with the difference being that the image was rotated by 90 degrees in order to clarify the shape and position of the electrodes 33 on the end of the ceramic sleeve 23.

An oblique perspective of the lower portion of the ceramic sleeve 23 further illustrates the placement relationship of the fuel injector nozzle 27 to the electrodes 33 in FIG. 3D.

Figure 4A:
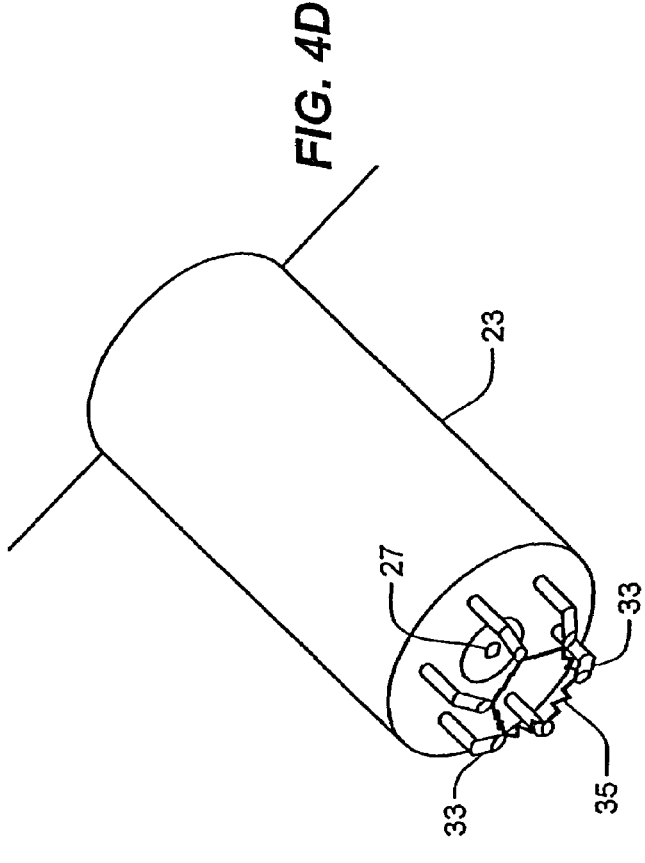
FIG. 4A is an enlarged side view of the injector/igniter apparatus with the Ring-of-Fire shown in operation.
Figure 4B:
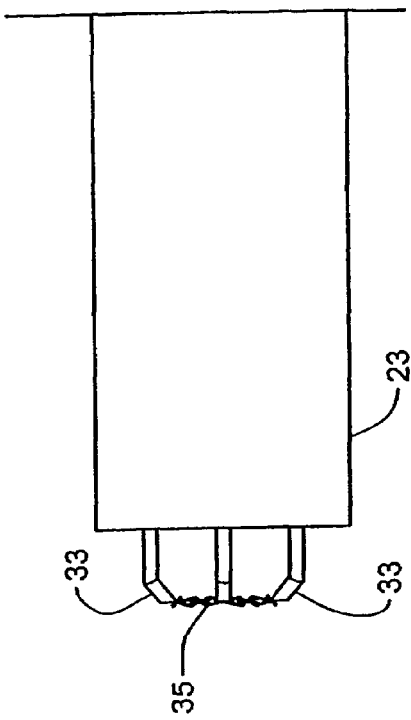
FIG. 4B is an enlarged bottom view of the injector/igniter apparatus with the Ring-of-Fire shown in operation.
Figure 4C:
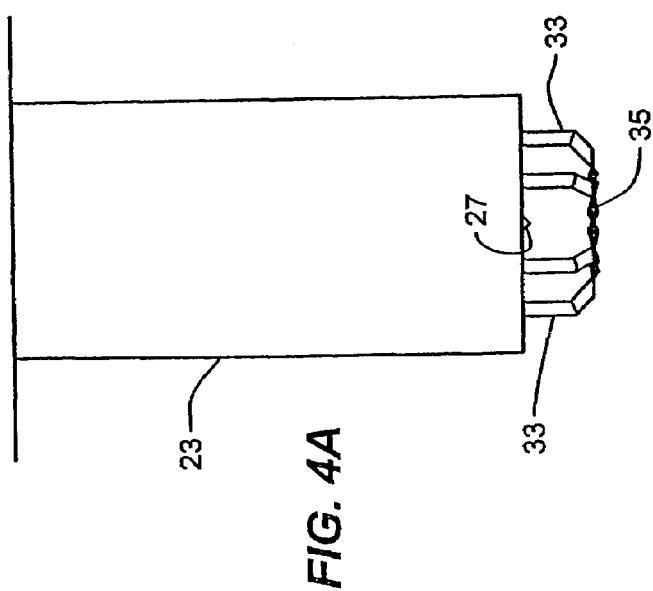
FIG. 4C is an enlarged side view of the injector/igniter apparatus rotated by 90 degrees from the view presented in FIG. 4A.

FIGS. 4A, 4B and 4C provide the same set of views as FIGS. 3A, 3B and 3C the inclusion of the operation of the high voltage discharge 35. This gives further clarification of the placement of the high voltage discharge 35 upon the electrodes 33 that are arrayed around the fuel injector nozzle 27 on the end of the ceramic sleeve 23 that faces the combustion chamber 17. This combustion chamber 17 could, within the scope of the present invention, be installed in any of a variety of engine types to include gas turbines as well as reciprocating 2-cycle and 4-cycle diesel or gasoline direct injected internal combustion engines.

Figure 4D:
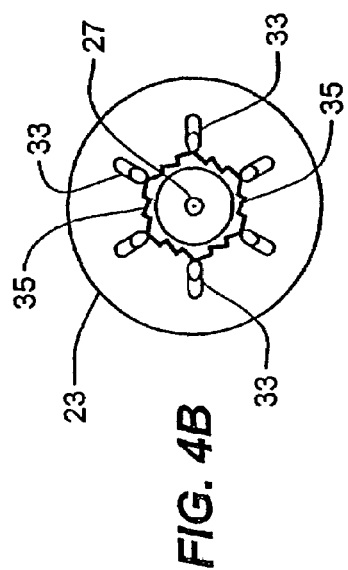
FIG. 4D is an enlarged perspective view of the injector/igniter apparatus with the Ring-of-Fire shown in operation.

FIG. 4D also shows the same oblique perspective view of the lower portion of the ceramic sleeve 23 as shown in FIG. 3D with the inclusion of the high voltage discharge 35 occurring between the six electrodes 33. Other numbers of electrodes to create the Ring-of-Fire are possible. Also, the Ring-of-Fire is schematically illustrated in these figures since it is difficult to illustrate completely.

FIGS. 5A, 5B, 5C and 5D show the lower portion of the ceramic sleeve 23 as shown in FIGS. 4A, 4B, 4C and 4D with the inclusion of fuel being injected by a fuel injector 21. The fuel injection spray pattern 37 of a pintle type of the fuel injector nozzle 27 places a cone of injected fuel centered to the high voltage discharge 35 that occurs between the electrodes 33 inside the combustion chamber 17. This insures complete combustion initiation of all of the fuel as it is injected.

FIGS. 6A, 6B, 6C and 6D show the lower portion of the ceramic sleeve 23 as shown in FIGS. 5A, 5B, 5C and 5D. The difference is that this time the fuel injector 21 has a fuel injector nozzle 27 of the hole type. The hole type fuel injector nozzle 27 produces a fuel injection spray pattern 37 that has a set of lobes. Each lobe sprays directly next to or through the high voltage discharge 35 thus insuring complete combustion initiation of all of the fuel as it is injected into the combustion chamber 17.

Figure 7A:
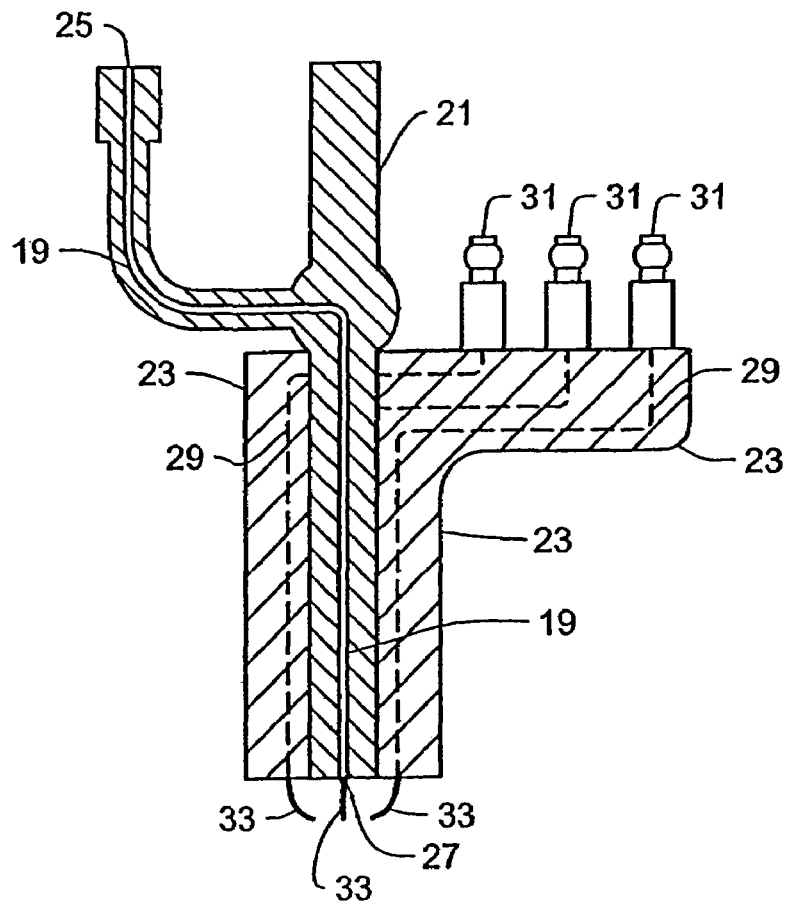
FIG. 7A is a cross sectional side view of the injector/igniter apparatus of the present invention.

Referring to FIG. 7A, the fuel injector 21 is installed inside the ceramic sleeve 23. When fuel injection is taking place, a fuel injector pump (not shown) sends pressurized fuel to the fuel inlet 25 of the fuel injector 21 in a manner known in the art. The pressurized fuel travels through fuel passageway 19 to the fuel injector nozzle 27 that injects the fuel into the combustion chamber 17. The ceramic sleeve 23 surrounds the lower portion of the fuel injector 21.

The upper end of the ceramic sleeve 23 that is above the cylinder head 15 has six high voltage terminals 31 that are connected to six embedded wires 29 that extend from the top to the bottom of the ceramic sleeve 23. The lower ends of the six embedded wires 29 extend from the bottom of the ceramic sleeve 23 into the combustion chamber 17 as six electrodes 33. These six electrodes 33 are positioned such that their tips are arranged so that they define a hexagon inside the combustion chamber 17 around and below the fuel injector nozzle 27. This placement is important to insure that the fuel injection spray pattern 37 from the fuel injector nozzle 27 must pass in close proximity to or through the high voltage discharge 35 that occurs between the tips of the electrodes 33.

Figure 7B:
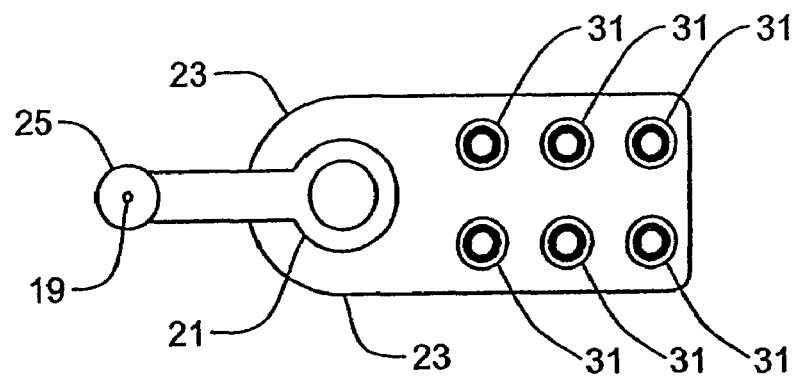
FIG. 7B is a top view of the injector/igniter apparatus of the present invention.

FIG. 7B shows a top view of the fuel injector 21 mounted through the ceramic sleeve 23 with the placement of the six high voltage terminals 31 clearly shown.

Figure 7C:
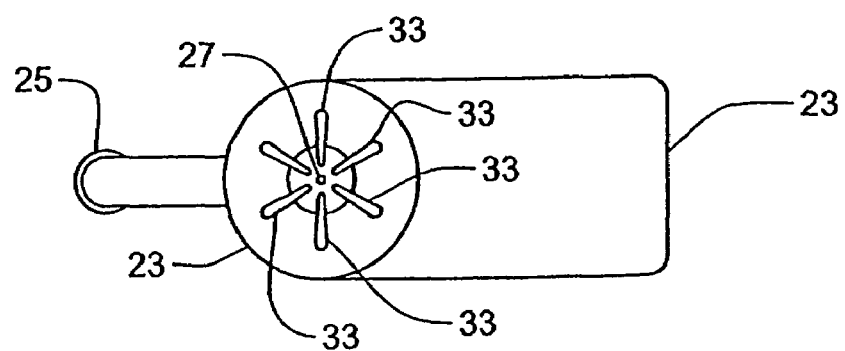
FIG. 7C is a bottom view of the injector/igniter apparatus of the present invention.

FIG. 7C is a view from the combustion chamber 17 looking up at the face of the ceramic sleeve 23 and at the tip of the fuel injector 21 with the fuel injection nozzle 27 in the center of the six electrodes 33.

Figure 8A:
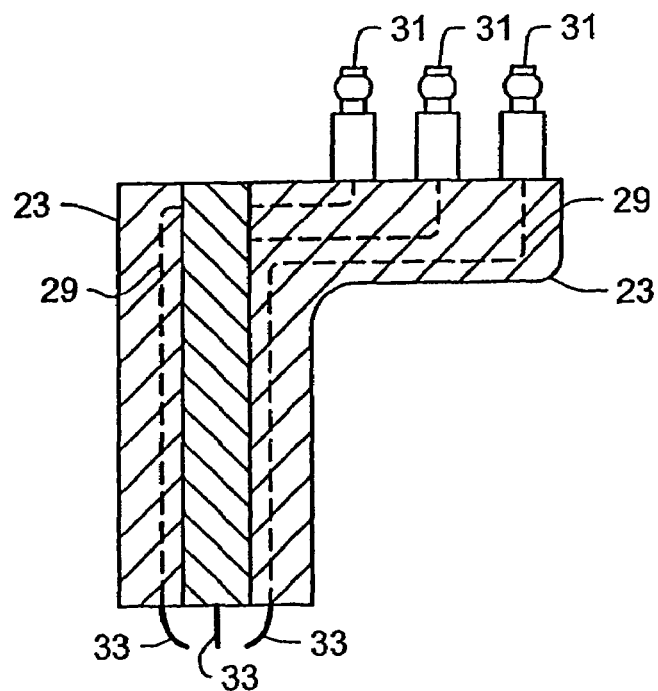
FIG. 8A is a cross sectional side view of the ceramic sleeve portion of the injector/igniter apparatus of the present invention.
Figure 8B:
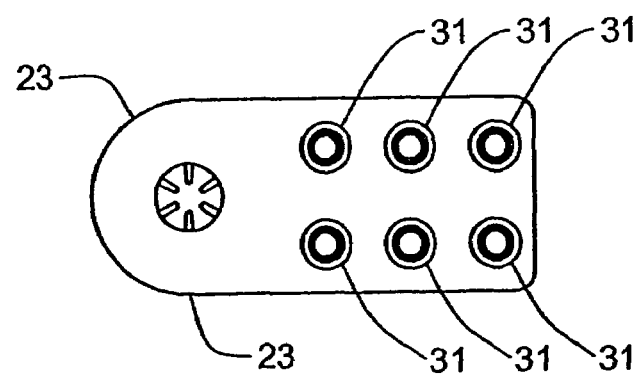
FIG. 8B is a top view of the ceramic sleeve portion of the injector/igniter apparatus of the present invention.
Figure 8C:
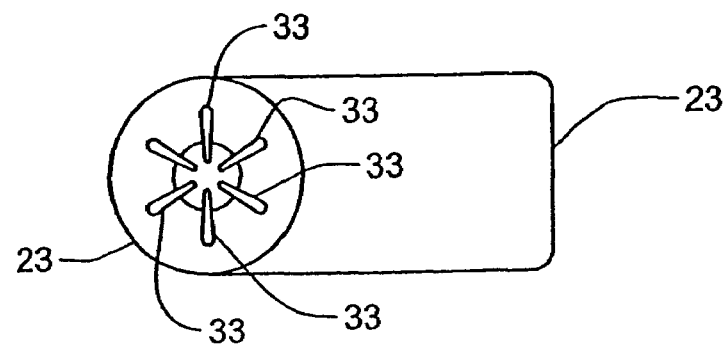
FIG. 8C is a bottom view drawing of the ceramic sleeve portion of the injector/igniter apparatus of the present invention.

FIGS. 8A, 8B and 8C are similar views as FIGS. 7A, 7B and 7C without the fuel injector 21 being shown to further clarify the positions of the high voltage terminals 31, the embedded wires 29 and the electrodes 33.

Figure 9:
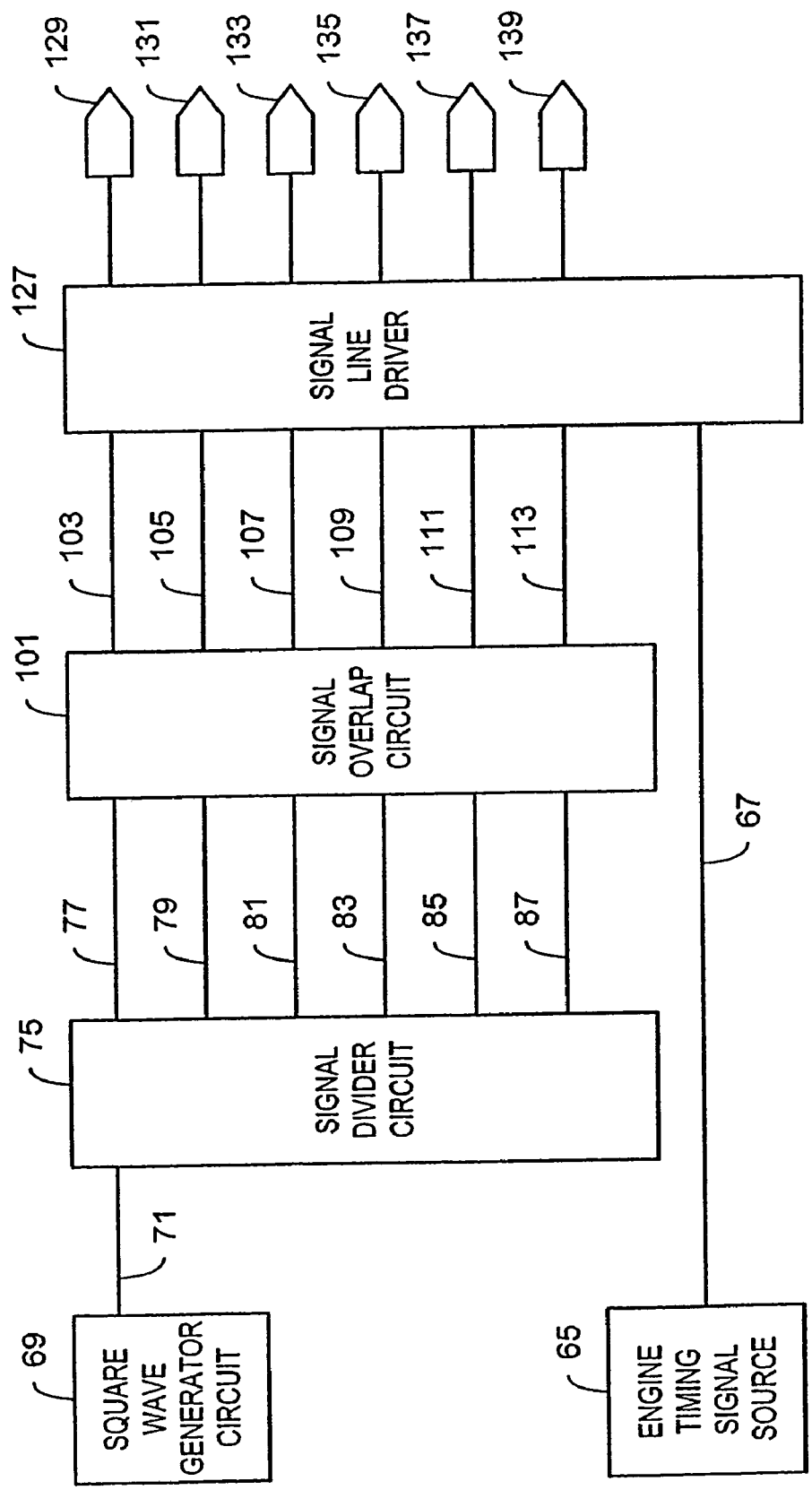
FIG. 9 is a block diagram of the signal generation circuit portion of the present invention.
Figure 10A:
FIG. 10A is a timing signal diagram of the square-wave signal created by the square-wave generator in the signal generation circuit of the present invention.

FIG. 9 shows the signal generation circuit 63 in detail. The signal generation circuit 63 controls the high voltage generation circuits 51, 52, 53, 55, 57, 59 and 61. The signals mentioned in this discussion are shown in detail by FIGS. 10A, 10B and 10C.

The signal generation circuit 63 has its overall output controlled by an engine timing signal source 65 that turns it on and off through an engine timing signal transmission line 67. The engine timing signal source 65 controls the signal generation circuit 63 so that at the appropriate time, at or before fuel injection is to take place, the high voltage discharge 35 is initiated. The engine timing signal source 65 keeps the high voltage discharge 35 going for as long as necessary to ensure complete combustion of all of the fuel and air mixture inside the combustion chamber 17.

The signal generation circuit 63 has within it a square-wave generator circuit 69 that sends through a square-wave signal transmission line 71, a square-wave signal 73 to a signal divider circuit 75. The square-wave generator circuit 63 is based on a 555 timer integrated circuit set up to operate as an astable multi-vibrator circuit producing a square-wave signal between 0 and 5 volts at a frequency between 5 and 30 kilo-hertz.

Figure 10B:
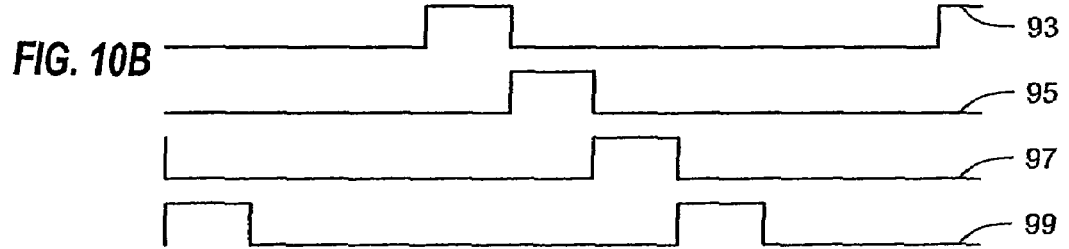
FIG. 10B is a timing signal diagram of the six sequential signals created by the signal divider circuit in the signal generation circuit of the present invention.

The signal divider circuit 75 divides the square-wave signal 73 into a set of six sequential signals 89, 91, 93, 95, 97 and 99, as shown in FIG. 10B, that are sent through a set of six sequential signal transmission lines 77, 79, 81, 83, 85 and 87 to a signal overlap circuit 101. The signal divider circuit 75 that divides the square-wave signal 73 into a set of six sequential signals 89, 91, 93, 95, 97 and 99 is based on the 4017 decade counter integrated circuit.

Figure 10C:
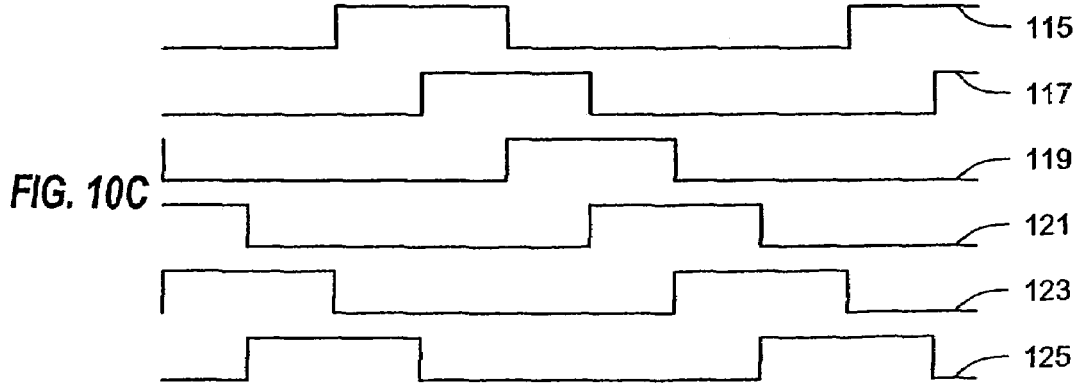
FIG. 10C is a timing signal diagram of the six overlapped sequential signals created by the signal overlap circuit in the signal generation circuit of the present invention.

The signal overlap circuit 101 in turn generates a set of six overlapped sequential signals 115, 117, 119, 121, 123 and 125, as shown in FIG. 10C, and then sends these signals through a set of six overlapped sequential signal lines 103, 105, 107, 109, 111 and 113 to a signal line driver circuit 127. The signal overlap circuit 101 uses a bank of twelve 1N4004 diodes to generate the set of six overlapped sequential signals 115, 117, 119, 121, 123 and 125 shown in FIG. 10C.

The signal line driver circuit 127 is activated only when the enable signal from the engine timing signal source 65, brought in by the engine timing signal transmission line 67 and it allows the set of six overlapped sequential signals 115, 117, 119, 121, 123 and 125 to go through the signal line driver circuit 127. The signal line driver circuit 127 uses a 74HCT541 integrated circuit to act as a "gate" to the set of six overlapped sequential signals 115, 117, 119, 121, 123 and 125.

It is within the scope of the present invention to have this engine timing signal source 65 be as simple as a cam-shaft position sensor, such as a Hall-effect sensor, or as complicated as a highly sophisticated engine management computer responding in real time to a number of factors to include actual conditions inside of the combustion chamber 17 as they happen in real time as is known in the art. When enabled by the engine timing signal source 65, the signal line driver circuit 127 then "cleans up" and strengthens the set of six overlapped sequential signals 115, 117, 119, 121, 123 and 125 without otherwise changing them before they are sent out through a set of six control signal output lines 129, 131, 133, 135, 137 and 139 to each of the six high voltage discharge circuits 51, 53, 55, 57, 59 and 61.

Figure 11:
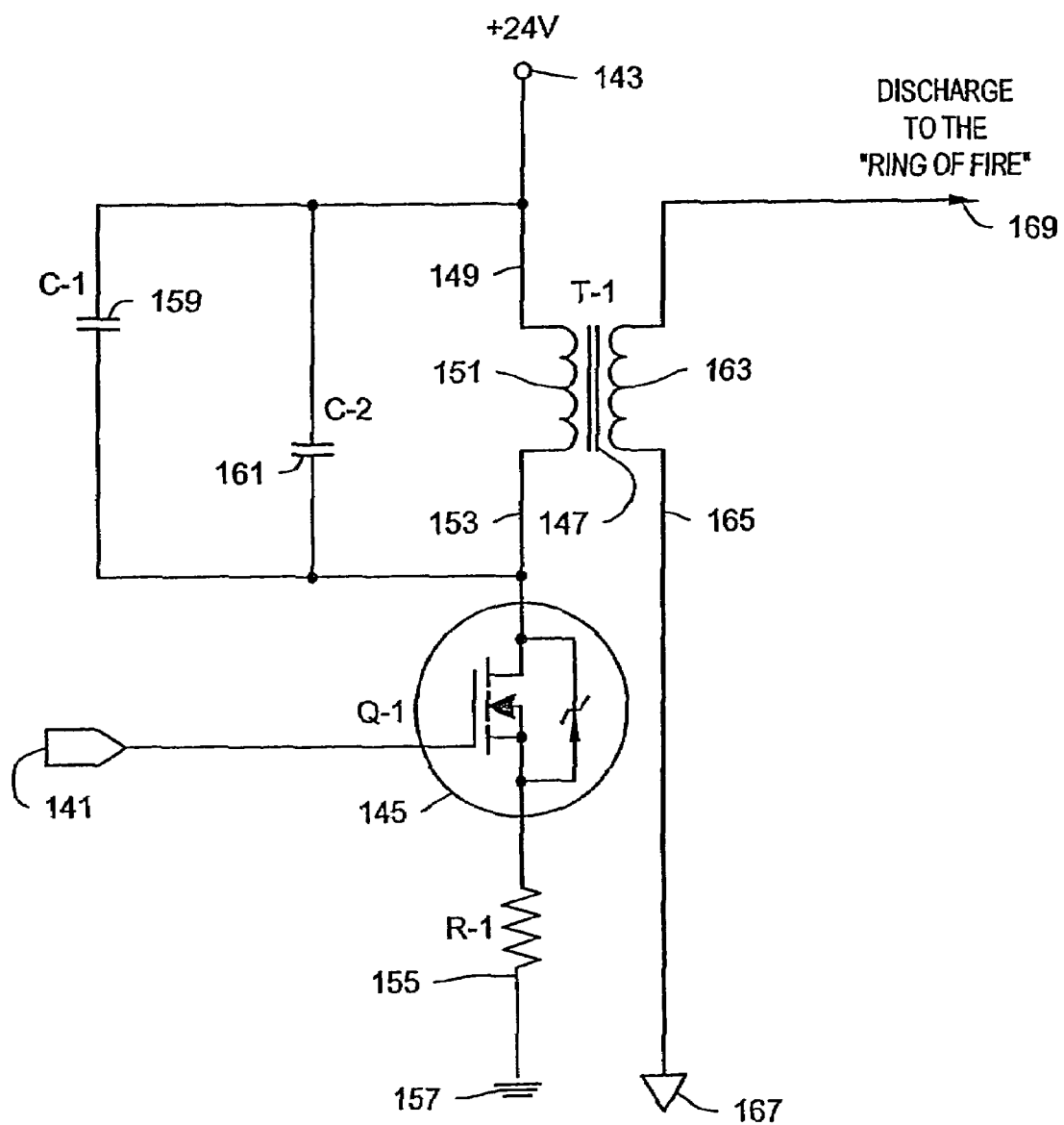
FIG. 11 is a schematic of one of the high voltage discharge circuits of the present invention.

FIG. 11 is an electrical schematic for each high voltage discharge circuit 51, 53, 55, 57, 59 and 61. Each of the six high voltage discharge circuits 51, 53, 55, 57, 59 and 61 is connected to a 24 volt power source 143 and to one of the six control signal output lines 129, 131, 133, 135, 137 and 139. When a signal is received by its intended high voltage discharge circuit 51, 53, 55, 57, 59 and 61 it turns on a power MOSFET 145 labeled Q-1. In one embodiment of the present invention, the power MOSFET (Metal Oxide Surface Effect Transistor) 145 labeled Q-1 is a MTY55N20E made by Motorola and it is rated for 55 amps at 200 volts.

When the power MOSFET 145 labeled Q-1 is turned on, a high voltage transformer 147 labeled T-1 then has current flow from the 24 volt power source 143 through a primary winding power lead 149. The current passes through a primary winding 151 of the high voltage transformer 147 labeled T-1, through a primary winding ground lead 153, through the power MOSFET 145 labeled Q-1, through a resistor 155 labeled R-1 that is rated at 0.2 ohms and 10 watts, and then finally to a low voltage ground connection 157. This low voltage ground connection 157 is shared by all of the six high voltage discharge circuits 51, 53, 55, 57, 59 and 61 and it is also used by all of the components of the signal generation circuit 63. There is a large value capacitor 159 labeled C-1 which is rated at 1 microfarad and a small value capacitor 161 labeled C-2 which is rated at 0.01 microfarads. Both are attached in parallel across the primary winding power lead 149 and the primary winding ground lead 153.

An electrically isolated secondary winding 163 of the high voltage transformer 147 labeled T-1 has an electrically isolated secondary winding ground lead 165 connected to an electrically isolated "floating" high voltage ground 167 that is shared in the same position of each circuit in all of the six high voltage discharge circuits 51, 53, 55, 57, 59 and 61. The electrically isolated secondary winding 163 of the high voltage transformer 147 labeled T-1 is connected to an electrically isolated secondary winding high voltage output lead 169. The electrically isolated secondary winding high voltage output lead 169 is in turn connected to the appropriate one of the set of six spark plug type high voltage wires 39, 41, 43, 45, 47 and 49 which in turn are connected to one of the set of six high voltage terminals 31 on the ceramic sleeve 23.

Figure 12:
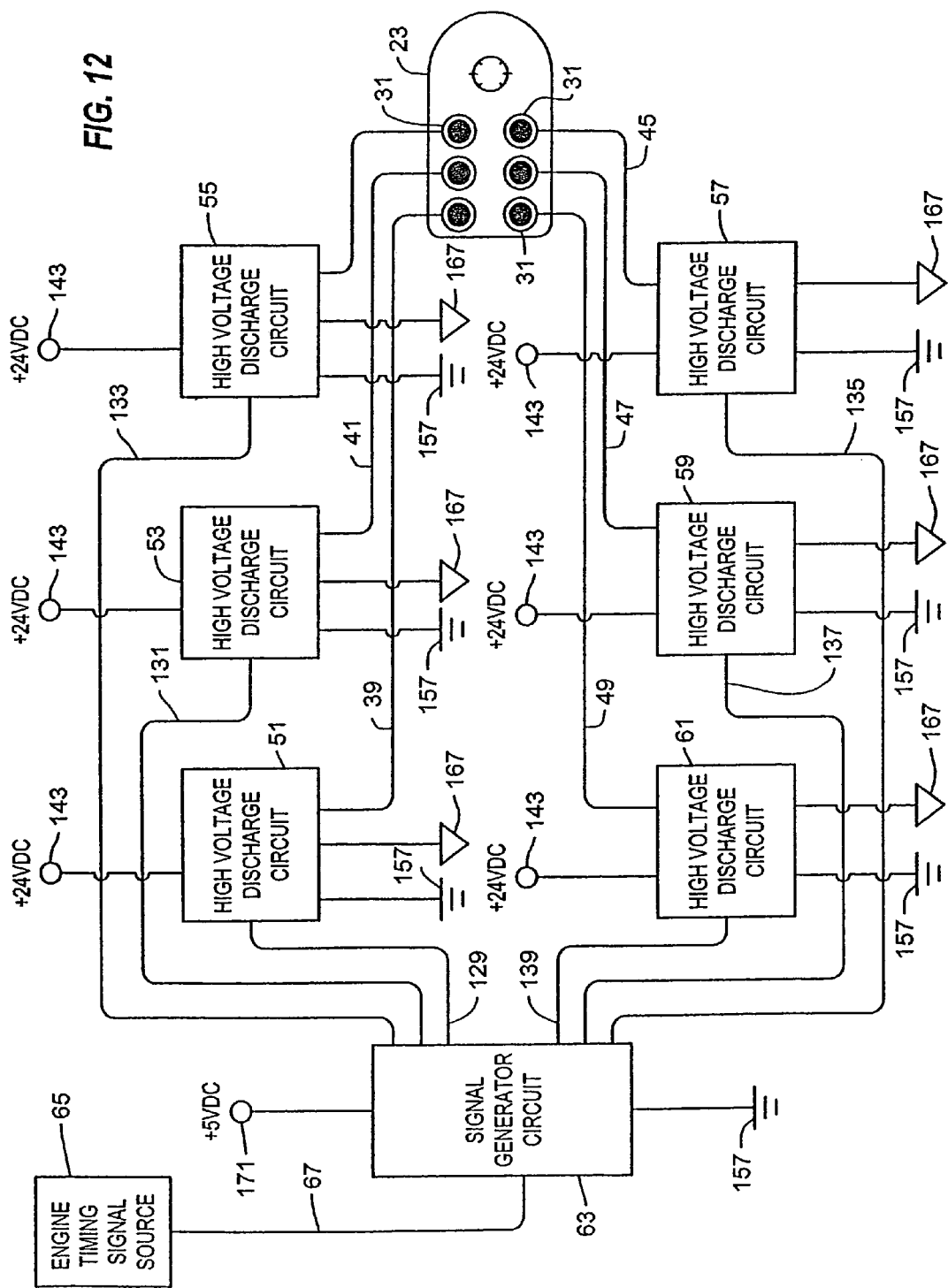
FIG. 12 is a diagram depicting all six high voltage discharge circuits attached to the ceramic sleeve portion of the injector/igniter apparatus of the present invention.

FIG. 12 shows the overall combination of elements of the electrical system according to the present invention. This includes a 5 volt power source 171 used by all of the circuitry inside the signal generation circuit 63. Further a low voltage ground connection 157 is shown as being shared by all of the high voltage discharge circuits 51, 53, 55, 57, 59 and 61 and with the signal generation circuit 63.

It should be appreciated that the other ways of creating and controlling the Ring-of-Fire high voltage discharge 35. Although any means of creating and controlling the Ring-of-Fire must place it so that the injected fuel spray pattern 37 goes next to or through it as fuel enters the combustion chamber 17.

Figure 13:
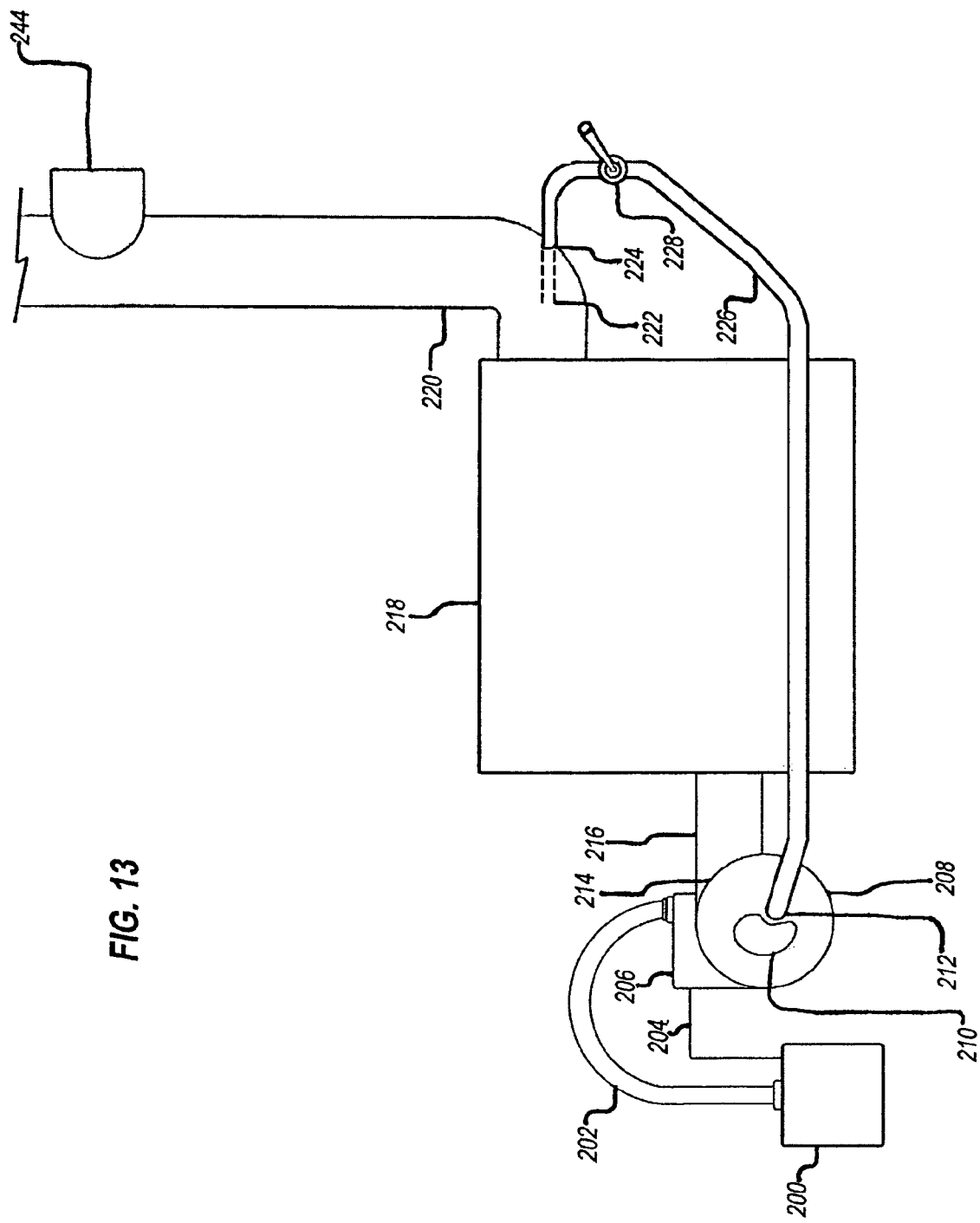
FIG. 13 is a side view of an entire furnace system with an oil burner equipped with the plasma point of use fuel treatment and exhaust gas recirculation system according to another embodiment of the present invention.

Referring to FIG. 13, the present invention also includes a furnace using the Ring-of-Fire or plasma ball ignition system. The furnace in FIG. 13 is shown with a plasma ball high voltage power source 200. The high voltage power source 200 sends out its plasma generating high voltage output through a bundle of six spark plug type high voltage wires 202 to a fuel burner circuitry housing 206 which is mounted on a fuel burner 208. An ignition control signal wire 204 connects the high voltage power source 200 to the fuel burner control system 332 shown in FIG. 19 which is inside the fuel burner circuitry housing 206. It is through the ignition control signal wire 204 that the on/off input for the high voltage source 200 is sent from the fuel burner control system 332.

A burner air tube 216 connects the fuel burner 208 to a furnace 218. A blower housing 214 brings in fresh air through an air inlet 210 and also brings in recirculated exhaust through a recirculated exhaust outlet 212 from an exhaust gas recirculation pipe 226.

The burner air tube 216 is connected to a furnace boiler 218 which is heated by combustion from the fuel burner 208. The combustion exhaust gases exit the furnace boiler 218 through a furnace exhaust flue 220. The exhaust gas recirculation pipe 226 enters the furnace exhaust flue 220 through a hole 224. The exhaust gas from the furnace exhaust flue 220 enters the exhaust gas recirculation pipe 226 through an exhaust gas recirculation inlet 222. An exhaust gas recirculation valve 228 can control the amount of exhaust gases recirculated. Although the exhaust recirculation valve 228 shown is as a manual valve, it is also possible to use an automatically controlled valve.

Exhaust gas recirculation reduces the amount of oxides of nitrogen formed during combustion by diluting the fresh air entering through the air inlet port 210 with exhaust originally taken from the furnace exhaust flue 220 and conveyed through the exhaust gas recirculation pipe 226 to the blower housing 214. This creates a measured dilution of the incoming fresh air charge with the exhaust and allows less fuel to be burned for a given volume of gas throughput to the burner 208 while still maintaining the proper fuel to air mixture. This has the overall effect of reducing the temperature at the tip of the combustion flame which is where the oxides of nitrogen are formed.

Once the main flow of exhaust gases pass the exhaust system junction, they then pass by an exhaust flue damper 244 before traveling the rest of the way out of the furnace exhaust flue 220 to the atmosphere.

Figure 14:
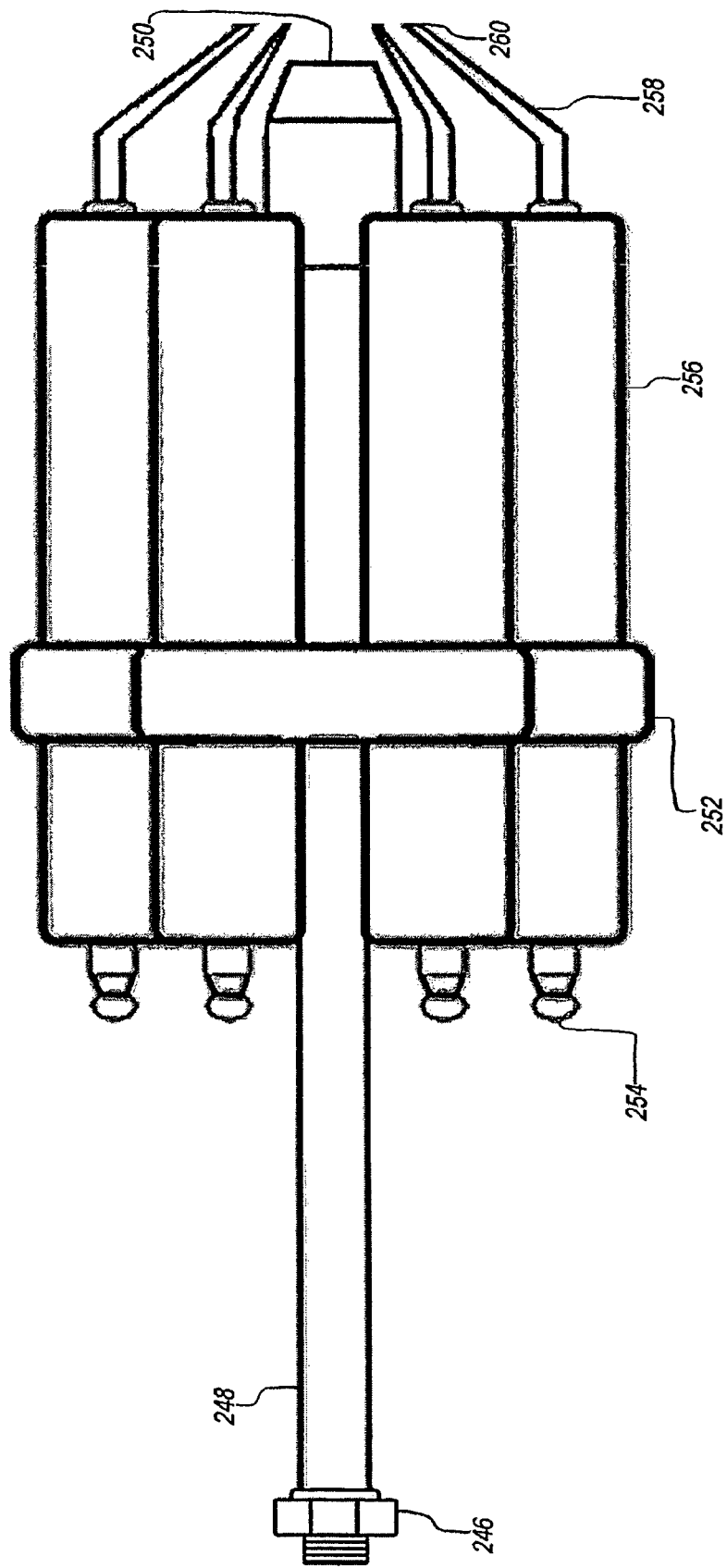
FIG. 14 is an enlarged side view of an oil burner fuel spray nozzle and igniter assembly removed from the burner air tube for clarity.

FIG. 14 shows a nozzle and igniter assembly that resides inside the burner air tube 216. When in operation, fuel for the nozzle and igniter assembly arrives through the burner nozzle fuel inlet 246 and then travels through a burner nozzle fuel pipe 248 to a fuel nozzle orifice 250. There is an electrode insulator mounting bracket 252 mounted to the burner nozzle fuel pipe 248 which holds a set of six plasma generation electrode insulators 256. Each plasma generation electrode insulators 256 has a plasma generation electrode 258 passing therethrough and the end closest to the fuel burner 208 has a plasma generation electrode terminal 254. The other end of the electrode 258 has a tip 260. The tips 260 are preferably evenly spaced around and in front of the fuel nozzle orifice 250. While six electrodes each having insulators are shown, at least three electrodes are needed to achieve the results of the present invention and more than six electrodes are also possible.

Figure 15:
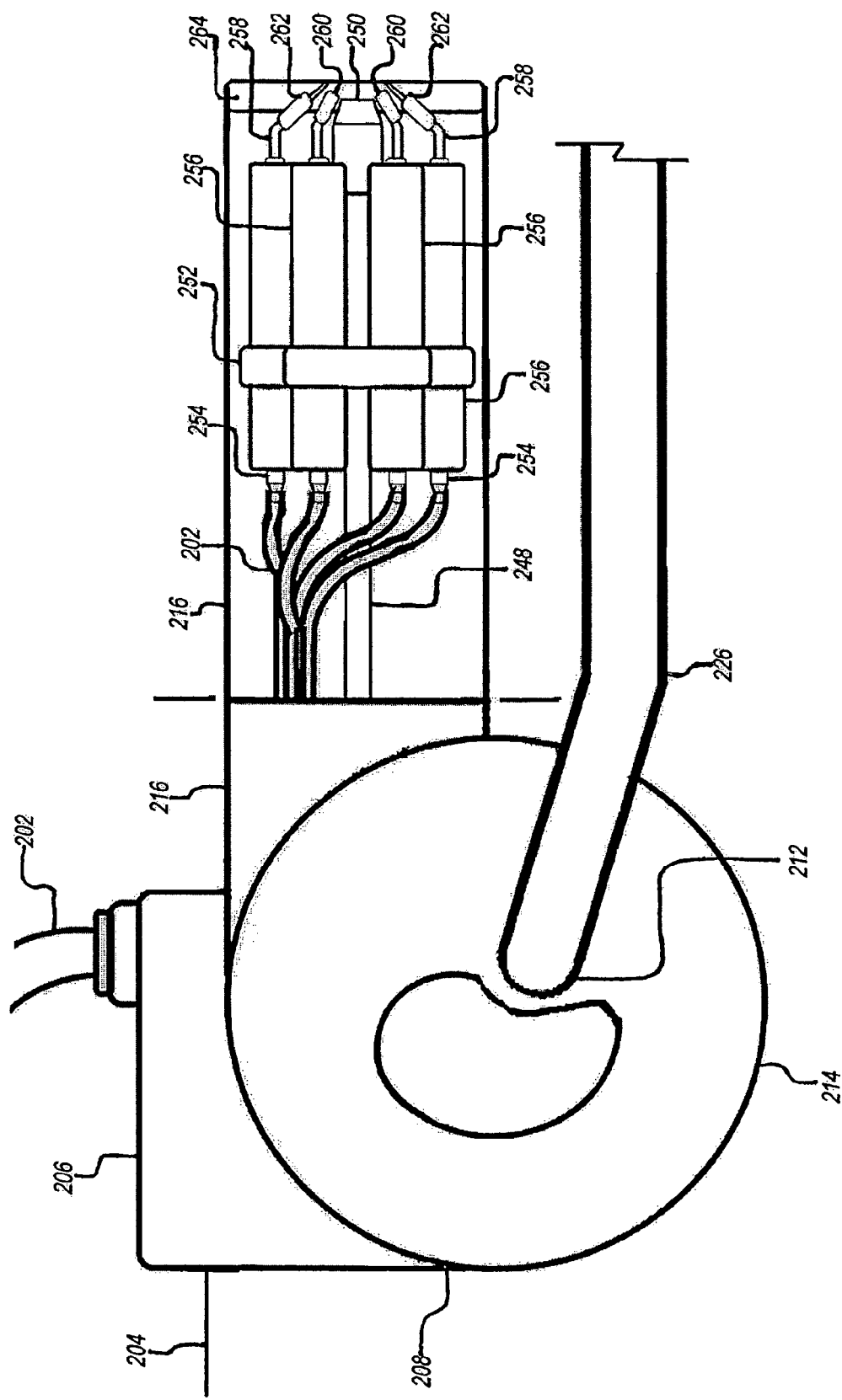
FIG. 15 is a side view of an oil burner equipped with the nozzle and igniter assembly of the present invention with the air tube partially cut away for clarity.

FIG. 15 shows the nozzle and igniter assembly mounted inside the burner air tube 216 with the power for the plasma generation coming through the bundle of high voltage wires 202 that are attached to the plasma generation electrode terminals 254. The other end of the bundle of the high voltage wires 202 is connected to the high voltage power source 200. On the front end of the air tube 216 is mounted a flame retention plate 264. The nozzle and igniter assembly has the electrode tips 260 protrude through the flame retention plate 264.

The plasma generation electrode tips 260 are placed in front of the fuel nozzle orifice 250. In order to prevent unintentional arcing between the plasma generation electrodes 258 and the flame retention plate 264, a set of plasma generation tip insulators 262 are mounted on the electrode 258 so as to leave the plasma electrode tips 260 exposed to form the plasma.

Figure 16:
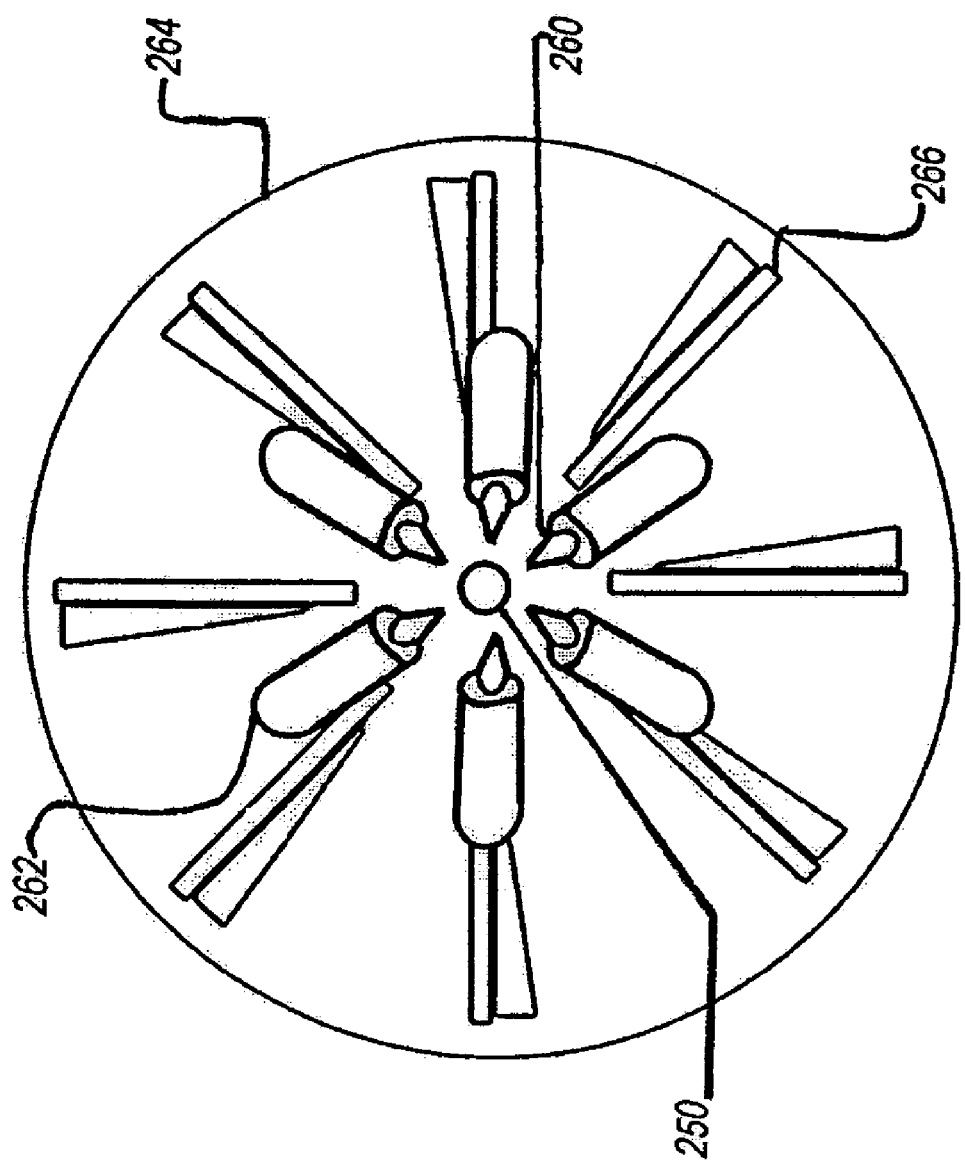
FIG. 16 is an enlarged front end view of the plasma electrode tips arrayed around the fuel spray nozzle with the flame retention plate in place according to the present invention.

FIG. 16 shows the arrangement of the plasma generation electrodes 260 and their insulators 262 with relation to the flame retention plate 264. Also clearly shown is how the set of plasma generation tips 260 are arrayed evenly around the fuel nozzle orifice 250. Also shown is a set of eight flame retention plate air passages 266 which are arrayed radially around the center of the flame retention plate 264.

Figure 17:
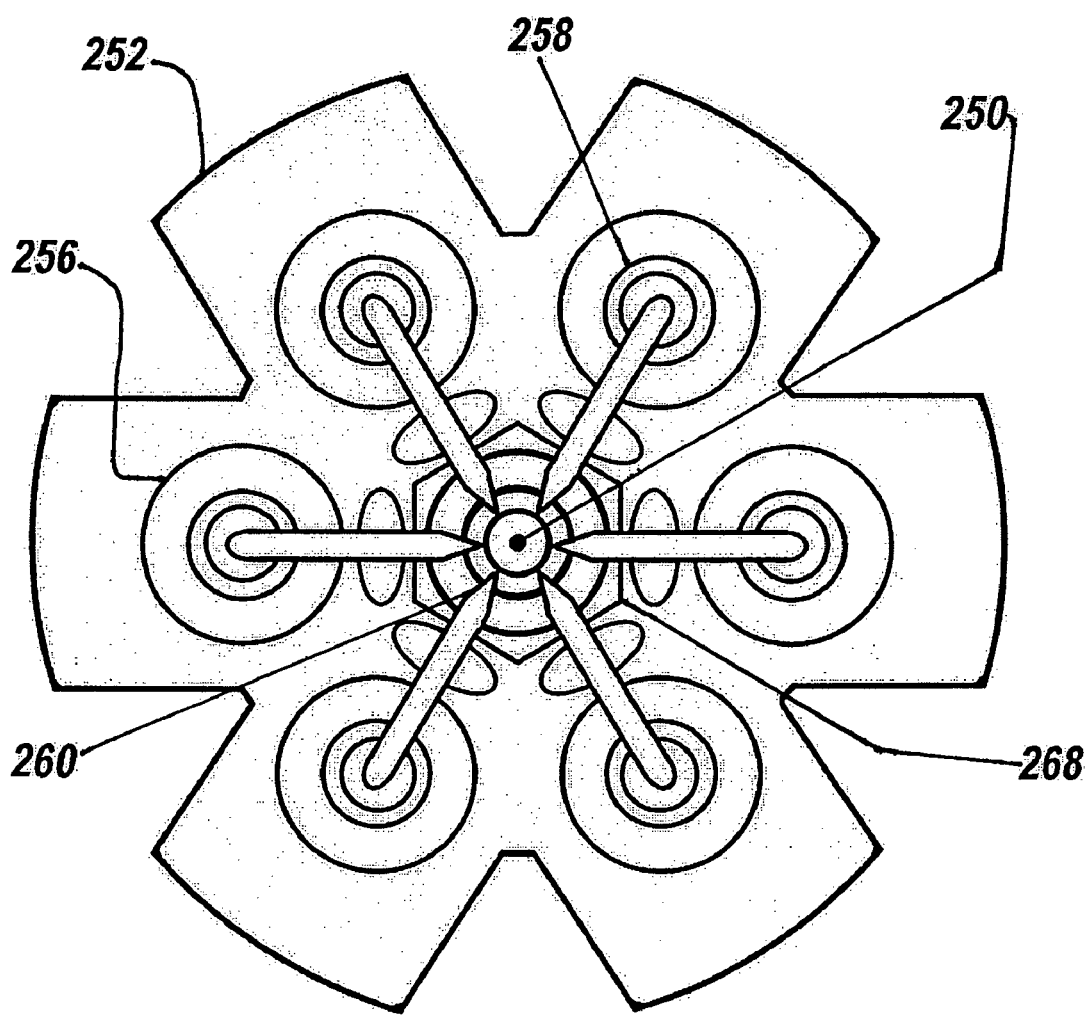
FIG. 17 is a front end view of the plasma electrode tips arrayed around the fuel spray nozzle with the flame retention plate and electrode tip insulators removed for clarity.

FIG. 17 is a front end view of the nozzle and igniter assembly with the flame retention plate 264 removed for clarity in order to expose the location of a fuel burner spray nozzle 268. The fuel burner spray nozzle 268 has the fuel nozzle orifice 250 in the center thereof with the set of six plasma generation electrode tips 260 arrayed radially there around.

When the furnace is in operation, the plasma generating high voltage output from the high voltage source 200 is sent through the bundle of high voltage wires 202 to the nozzle and igniter assembly. There each wire from the bundle of high voltage wires 202 is attached to the respective plasma generation electrode terminal 254. This allows the plasma generating high voltage output to be conducted along the length of the electrodes 258 to the plasma generation electrode tips 260.

At the tips 260, the plasma generating high voltage output from the high voltage source 200 discharges and thereby forms a plasma ball that all of the fuel spraying out from the fuel nozzle orifice 250 must pass through.

The plasma ball is believed to be the main location where the fuel treatment and ignition occur. As best understood, the effect of the plasma ball on the fuel spray that passes therethrough is to remove at least some of the outer valence electrons holding the fuel molecule together. This causes the fuel molecule to break apart into shorter chain hydrocarbons that have also been ionized as a result of passing through the plasma. These ionized shorter chain hydrocarbons not only burn cleaner and more efficiently when compared to longer chain hydrocarbons, the ionized shorter chain hydrocarbons also ignite rapidly upon contact with oxygen due to their ionization state.

Figure 18:
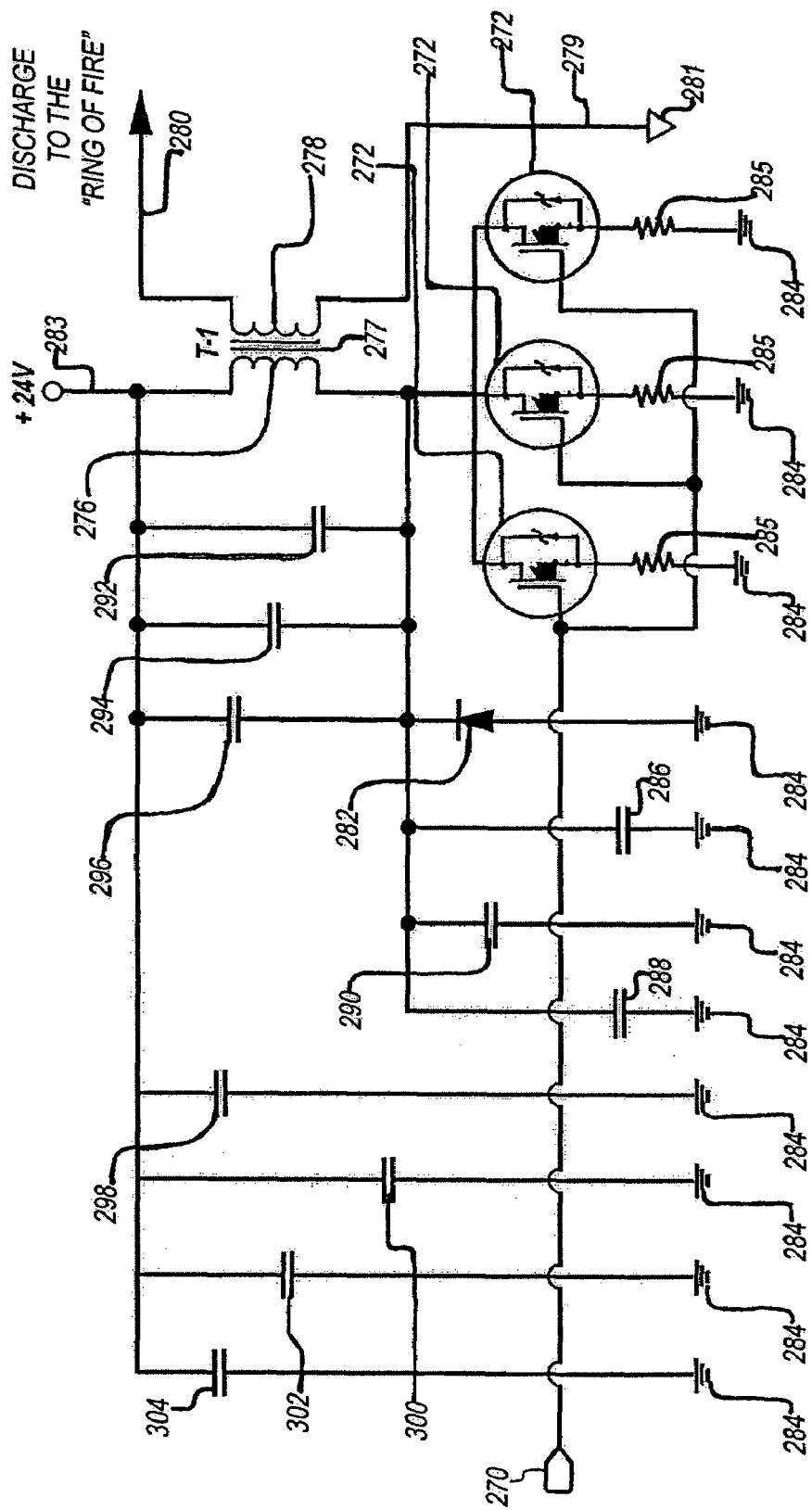
FIG. 18 is a schematic of one of the improved high voltage discharge circuits that supply a multi-frequency high voltage output to one electrode of the nozzle and igniter assembly of the present invention.

FIG. 18 shows the schematic diagram of a single high voltage discharge circuit out of the at least three high voltage discharge circuits within the high voltage power source 200. The number of high voltage discharge circuits is equal to the number of electrodes used in the device. This circuit is controlled through a control signal input line 270 that is connected to the gates of a set of three matching power Metal Oxide Surface Field Effect Transistors (henceforth referred to as MOSFETs) 272. These three MOSFETs 272 are the switches that when turned on allow current to flow from a 24-volt power source 283 through a primary winding 276 of a high voltage transformer labeled T1 277. The three MOSFETs 272 connect the other end of the primary winding 276 to a low voltage ground connection 284 through a 0.2 ohm resistor 285. Between the low voltage side of the primary winding 276 and low voltage ground 284 are a capacitor of 4700 picofarads 286, another capacitor of 4700 picofarads 288 and a capacitor of 2200 picofarads 290 and a high amperage diode 282. When used in this circuit, the high amperage diode 282 acts as a free wheeling diode.

Connected across the leads to the primary winding 276 are a capacitor of 0.047 microfarads 292, a capacitor of 0.1 microfarads 294 and a capacitor of 2200 picofarads 296. Also attached to the power side of the primary winding 276 connected to the low voltage ground 284 are a capacitor of 4700 picofarads 298, a capacitor of 2200 picofarads 300, a capacitor of 0.1 microfarads 302 and a capacitor of 1.0 microfarad 304.

Connected to a secondary winding 278 of the high voltage transformer labeled T1 277 is a spark plug type high voltage wire 280 that eventually goes to the plasma generation electrode terminal 254 of one of the plasma generation electrodes 258. The other lead from the secondary winding 278 of the high voltage transformer labeled T1 277 is an electrically isolated secondary winding ground lead 279 connected to an electrically isolated "floating" high voltage ground 281.

When the power MOSFETs 272 are turned on by an input from a signal generation circuit 330 (shown in FIG. 19) through the control signal input line 270 more than just the electricity from the 24 volt power source 283 flows through the primary winding 276 of the high voltage transformer labeled T-1 277. Four capacitors 298, 300, 302, and 304 of different values also discharge through the primary winding 276 of the high voltage transformer 277.

These four capacitors 298, 300, 302, and 304 also set up a resonant tank circuit with the primary winding 276 which acts as the inductor in the tank circuit. Since each of the four capacitors 298, 300, 302, and 304 have a different value, four resonant tank circuits are set up, each one resonating at a different frequency. When the power MOSFETs 272 are turned on, the diode 282 plays an important role in this resonance in that the diode 282 and the power MOSFETs 272 allow current to flow in both directions during resonance through the primary winding 276. When the power MOSFETs 272 are turned off, resonance can occur for another half cycle through the diode 282.

This does not however stop circuit resonance because at this point the three capacitors 292, 294, 296 (each of a different value) that are across the leads to the primary winding 276 take over and continue to resonate in the resonant tank circuit they form. Since these three capacitors 292, 294, and 296 all have different values, three different tank circuits are formed that continue to resonate at three different frequencies even after the power MOSFETs 272 are turned off.

Also contributing to the collection of various resonant frequencies are the three capacitors 286, 288, and 290 that are connected between the lead of the primary winding 276 opposite its lead connected to the 24 volt power source 283 and the low voltage ground 284. Although the values of two of the capacitors 286 and 288 are the same, it was determined empirically that this combination produced the most vigorous plasma discharge.

Figure 19:
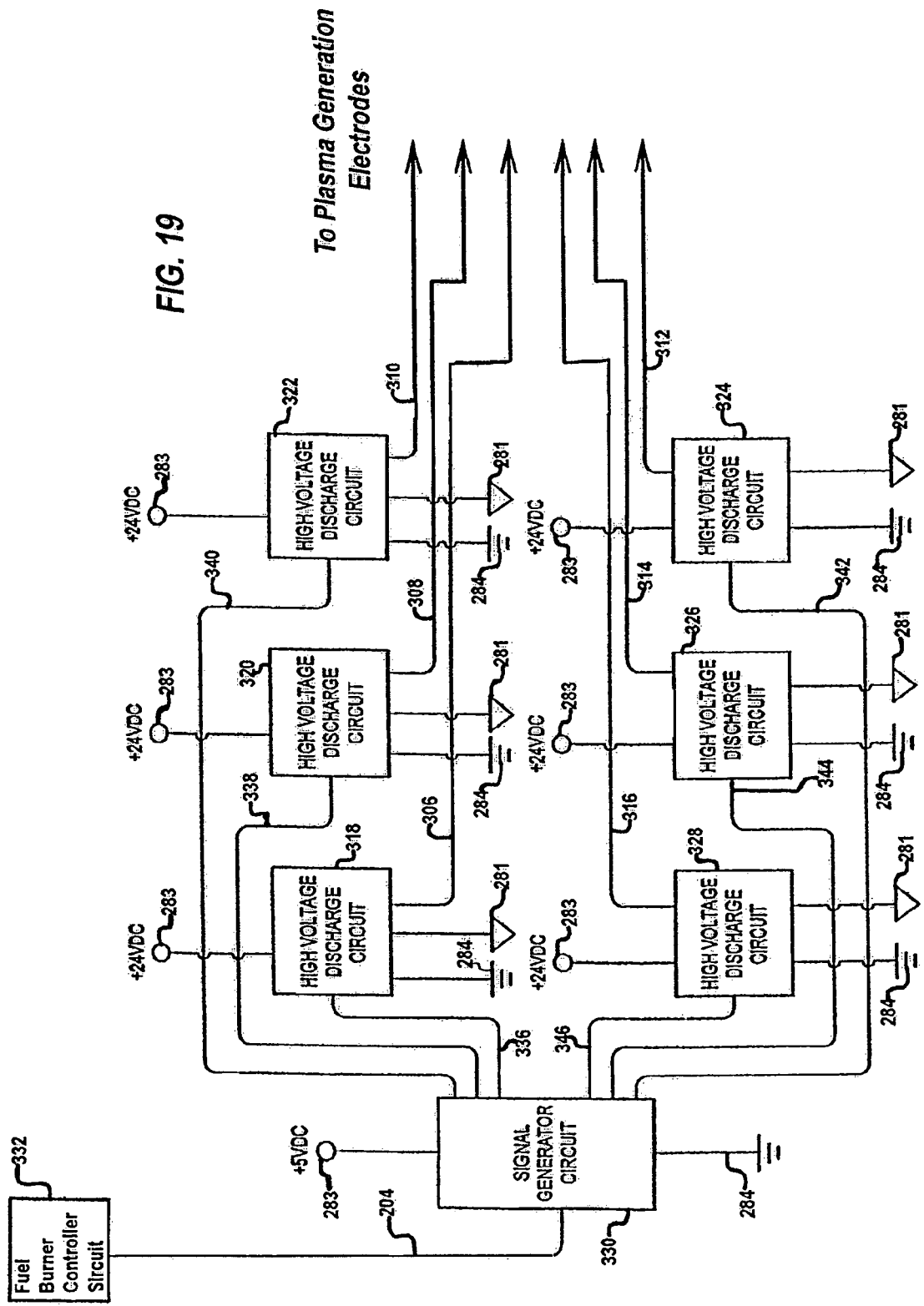
FIG. 19 is a diagram depicting a signal generation circuit and six high voltage discharge circuits that produce the multi-frequency high voltage outputs that supply the electrodes of the nozzle and igniter assembly in a fuel burner according to the present invention.

FIG. 19 shows how a set of six high voltage discharge circuits 318, 320, 322, 324, 326, and 328 of the type shown in FIG. 18 are put together inside the high voltage power source 200. Not only do the individual high voltage power discharge circuits 318, 320, 322, 324, 326, and 328 produce a wide variety of resonance frequencies, these circuits also interact with each other through the electrically isolated "floating" high voltage ground 281. As a result, all six of the plasma generation electrodes 258 are contributing to the ball of plasma at all times. It is believed that this is a reason why the plasma ball is formed between the set of six electrode tips 260 instead of what would appear to be a circular arc with a hole in it that would allow fuel to pass through without being ionized.

When the fuel burner control circuit 232 inside the fuel circuitry housing 206 turns on the fuel burner 208, the fuel burner control circuit 232 also sends an enable signal through the ignition control signal wire 204 to the signal generation circuit 330. The other aspects of the circuit in FIG. 19 are similar to the circuit block diagram shown in FIG. 12. The main difference is that the six high voltage outputs go through the high voltage wires 306, 308, 310, 312 and 314 which are grouped together into a bundle of high voltage wires 202. The wires 202 connect with the nozzle and igniter assembly in the oil burner 208 instead of being connected to an injector-igniter assembly 23 in an internal combustion engine as described in FIG. 12.

The other major difference is that plasma generation for use in the fuel burner 208 is continuous for as long as it is in operation to provide a flame to the furnace boiler 218. It is because of this continuous plasma generation that the approach of having three MOSFETs 272 in parallel with each other was adopted in order to reduce heat buildup therein. In order to handle the greater fuel flow rate found in larger furnaces and similar installations it was necessary to develop the improved high voltage discharge circuit design in order to produce a larger and more intense plasma.

It is to be understood that although the present invention has been described with regards to preferred embodiments thereof, various other embodiments and variants may occur to those skilled in the art, which are within the scope and spirit of the invention, and such other embodiments and variants are intended to be covered by the following claims.

What is claimed is:

1. A furnace comprising:
 a housing;
 an inlet flow tube connected to the housing;
 an outlet passage connected to the housing for removing exhaust gases from said housing;
 an air blower attached to the inlet flow tube;
 an ignition device including:

at least three electrodes having electrode tips, said electrode tips define a polygonal area disposed in close proximity to a location where fuel is injected; and a high voltage generation circuit for receiving electrical energy and creates a high voltage output that is delivered to said at least three electrodes; and wherein said electrode tips are arranged so that when the high voltage output from said high voltage generation circuit is supplied to each said electrode, a plasma ionization zone is formed between said at least three electrode tips; and a fuel supply line having an outlet disposed in a center of said at least three electrodes, whereby fuel is supplied from the outlet of said fuel supply line to the polygonal area.

* * * * *